United States Patent
Lawrence

(10) Patent No.: US 11,985,981 B2
(45) Date of Patent: May 21, 2024

(54) COMESTIBLE FLATTENER TRANSLATION

(71) Applicant: Lawrence Equipment Inc., South El Monte, CA (US)

(72) Inventor: Eric Clay Lawrence, So. El Monte, CA (US)

(73) Assignee: Lawrence Equipment, Inc., South El Monte, CA (US)

( * ) Notice: Subject to any disclaimer, the term of this patent is extended or adjusted under 35 U.S.C. 154(b) by 286 days.

(21) Appl. No.: 17/399,644

(22) Filed: Aug. 11, 2021

(65) Prior Publication Data

US 2022/0117240 A1 Apr. 21, 2022

Related U.S. Application Data

(60) Provisional application No. 63/092,271, filed on Oct. 15, 2020.

(51) Int. Cl.
| | | |
|---|---|---|
| *A21C 11/00* | (2006.01) | |
| *A21C 9/08* | (2006.01) | |
| *B65G 47/04* | (2006.01) | |

(52) U.S. Cl.
CPC ............ *A21C 11/006* (2013.01); *A21C 9/085* (2013.01); *B65G 47/04* (2013.01); *A21C 9/08* (2013.01); *B65G 2201/0202* (2013.01)

(58) Field of Classification Search
CPC ..... A21C 11/006; A21C 11/008; A21C 9/085; A21C 9/08
See application file for complete search history.

(56) References Cited

U.S. PATENT DOCUMENTS

| | | | |
|---|---|---|---|
| 2,478,676 A | 8/1949 | Temple, Sr. | |
| 2,587,959 A | 3/1952 | Biner | |
| 3,599,579 A | 8/1971 | Paaskesen et al. | |
| 4,421,542 A | 12/1983 | Poad et al. | |
| 4,668,524 A | 5/1987 | Kirkpatrick | |
| 5,231,919 A * | 8/1993 | Lawrence | B65G 43/00 |
| | | | 198/341.02 |
| 5,252,055 A | 10/1993 | Mangiavacca | |
| 5,396,833 A | 3/1995 | Atwood et al. | |

(Continued)

FOREIGN PATENT DOCUMENTS

| | | |
|---|---|---|
| CN | 2258341 | 7/1997 |
| CN | 107618709 | 1/2018 |

(Continued)

OTHER PUBLICATIONS

International Search Report & Written Opinion in International Appln. No. PCT/US2021/046652, dated Nov. 30, 2021, 17 pages.

(Continued)

*Primary Examiner* — Reginald Alexander
(74) *Attorney, Agent, or Firm* — Fish & Richardson P.C.

(57) ABSTRACT

Methods, systems, and apparatus, including computer programs encoded on computer storage media, for a comestible loader with flatteners that pivot and translate. One of the methods includes receiving, by a comestible loader, a comestible through an opening defined in a loader frame of the comestible loader and onto a surface; and pivoting and translating a first flattener and a second flattener to a pre-press position to permit the first flattener and the second flattener to position the comestible approximately at a target position on the surface.

30 Claims, 10 Drawing Sheets

(56) References Cited

U.S. PATENT DOCUMENTS

| | | | |
|---|---|---|---|
| 5,786,016 | A | 7/1998 | Campbell et al. |
| 6,015,584 | A | 1/2000 | Lawrence |
| 6,361,307 | B1 | 3/2002 | Bernhard et al. |
| 7,229,270 | B2 | 6/2007 | Schultz |
| 7,401,694 | B2 | 7/2008 | Schultz |
| 8,770,960 | B2 | 7/2014 | Mattias et al. |
| 8,784,918 | B2 | 7/2014 | Arevalo |
| 9,477,220 | B2 | 10/2016 | Shteinfeld et al. |
| 11,744,252 | B2 | 9/2023 | Lawrence |
| 2002/0089110 | A1 | 7/2002 | Ely |
| 2003/0068418 | A1 | 4/2003 | Bell et al. |
| 2004/0241267 | A1 | 12/2004 | Schultz |
| 2005/0244560 | A1 | 11/2005 | Schultz |
| 2006/0045945 | A1 | 3/2006 | Pack et al. |
| 2008/0276810 | A1 | 11/2008 | Ceja et al. |
| 2009/0074902 | A1 | 3/2009 | Schultz |
| 2009/0090253 | A1 | 4/2009 | Wells et al. |
| 2021/0274793 | A1 | 9/2021 | Lawrence |

FOREIGN PATENT DOCUMENTS

| | | |
|---|---|---|
| CN | 208297339 | 12/2018 |
| FR | 2798823 | 9/1999 |
| JP | 2002-506619 | 3/2002 |
| JP | 2015-181383 | 10/2015 |
| JP | 2016-042797 | 4/2016 |
| JP | 2018-186735 | 11/2018 |
| WO | WO 1999/46995 | 9/1999 |
| WO | WO 2002/007521 | 1/2002 |
| WO | WO 2008/015756 | 2/2008 |
| WO | WO 2015/170968 | 11/2015 |

OTHER PUBLICATIONS

Fenlon, [online], "Double Dough Detection and Rejection (Bread, Hovis, Warburtons, Kingsmill)", Jan. 15, 2014, retrieved on Mar. 9, 2020, Retrieved from URL <https://www.youtube.com/watch?v=jpXth0Q2Ugw&feature=youtu.be>, 3 pages [Video Submission].

International Preliminary Report on Patentability in International Appln. No. PCT/US2021/021309, dated Sep. 22, 2022, 14 pages.

International Search Report and Written Opinion in International Appln. No. PCT/US2021/021309, dated Jul. 9, 2021, 22 pages.

Office Action in Japanese Appln. No. 2022-554337, dated Sep. 5, 2023, 7 pages (with English translation).

* cited by examiner

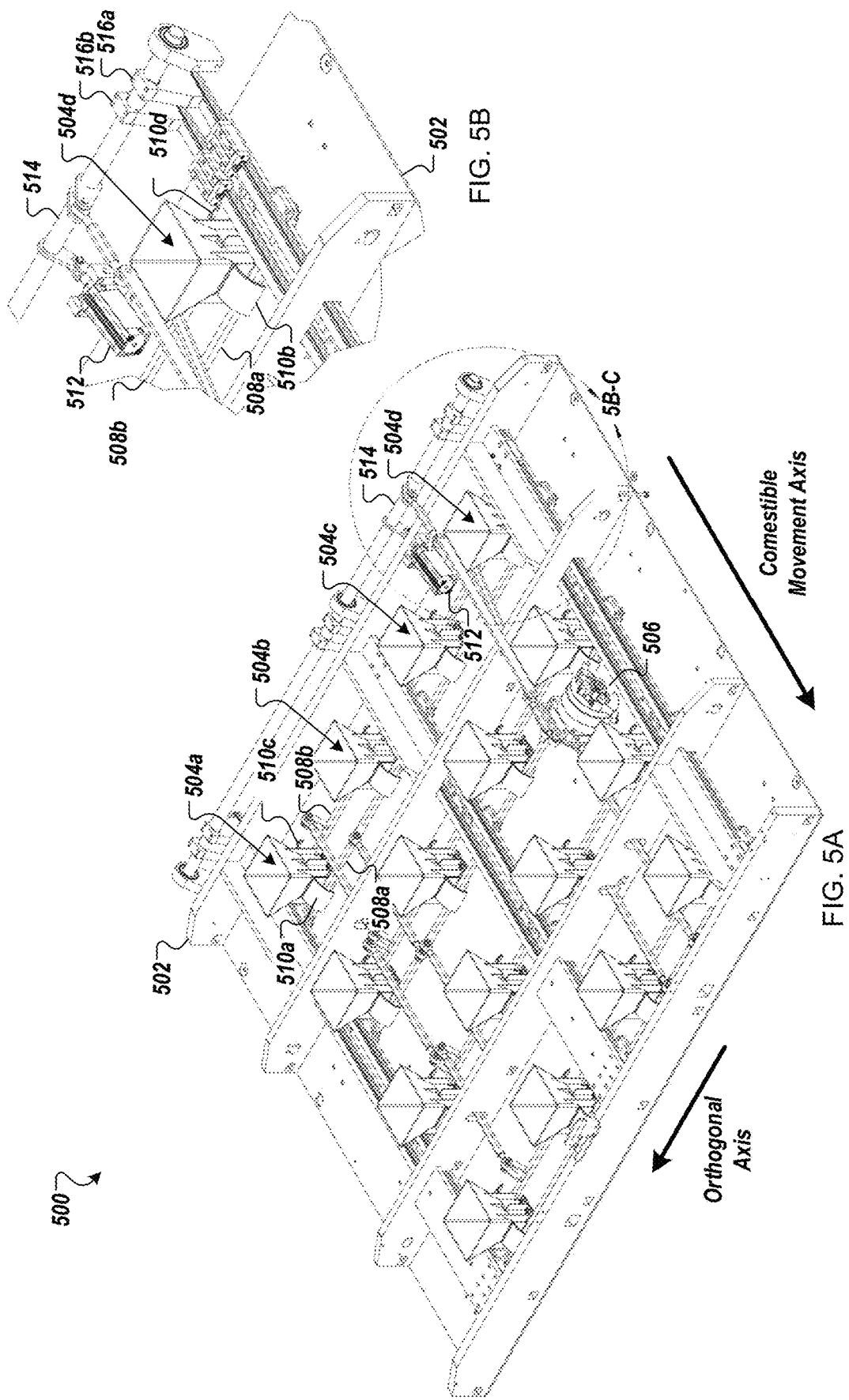

COMESTIBLE FLATTENER TRANSLATION

CROSS-REFERENCE TO RELATED APPLICATION

This application claims the benefit of U.S. Provisional Application No. 63/092,271, filed on Oct. 15, 2020, the contents of which are incorporated by reference herein.

BACKGROUND

Examples of comestible products are flatbreads, which include, for example, tortillas, pita bread, pizza crusts, chapatti, and naan. Flatbreads can be made by hand or with automated equipment. For example, a factory can produce one or more types of flatbread. Factories can use partially or fully automated systems to produce flatbread. Automated methods to form flatbread can include, for example, die cutting, sheeting, and pressing of flatbread dough.

Factories can include different types of tools or equipment for the different stages in the production process, such as a mixer, a press, and an oven. Some production lines have tools to form flatbread dough into a ball and other tools to flatten the dough for baking. The flattened dough can have a circular shape and a specific thickness so the flatbread will have a desired thickness after baking.

SUMMARY

The present disclosure describes methods, systems, and apparatus, including computer programs encoded on computer storage media, for a comestible loader with flatteners that pivot and translate.

One aspect of the present disclosure features a comestible system including a comestible loader adapted to receive a comestible and place the comestible on a surface. The comestible loader includes a loader plate comprising an opening passing through the loader plate, the opening adapted for a comestible to move through the loader plate and onto the surface; a first flattener and a second flattener pivotably and translationally attached to the loader plate at the opening; and one or more actuators i) coupled to the first flattener and the second flattener, and ii) adapted to pivot and translate the first flattener and the second flattener to cause the first flattener and the second flattener to support the comestible within the opening and position the comestible approximately at a target position on the surface.

In some embodiments, the system includes one or more actuators ii) coupled to the comestible loader to vertically actuate the comestible loader plate up and down relative to the surface.

In some embodiments, the one or more actuators coupled to the loader plate and adapted to pivot and translate the first flattener and the second flattener include two actuators. In some embodiments, the one or more actuators coupled to the loader plate and adapted to pivot and translate the first flattener and the second flattener comprise a valve and one or more axles to pivot the first flattener and the second flattener.

In some embodiments, the one or more actuators coupled to the loader plate are adapted to pivot and translate the first flattener and the second flattener to cause the first flattener and the second flattener to support the comestible within the opening, to allow the comestible to pass through the opening and onto the surface, and to position the comestible approximately at the target position on the surface.

In some embodiments, the one or more actuators coupled to the loader plate are adapted to: pivot and translate the first flattener and the second flattener to respective closed positions to cause the first flattener and the second flattener to support the comestible within the opening, the first flattener and the second flattener having a first distance between respective actuator coupling locations of the first flattener and the second flattener when at the closed positions; and pivot and translate the first flattener and the second flattener to respective pre-press positions to cause the first flattener and the second flattener to position the comestible approximately at the target position on the surface, the first flattener and the second flattener having a second distance between respective actuator coupling locations of the first flattener and the second flattener when at the pre-press positions, the second distance being a different distance than the first distance.

In some embodiments, the one or more actuators are adapted to cause a first inner surface of the first flattener to contact at least part of a second inner surface of the second flattener when the one or more actuators pivot and translate the first flattener and the second flattener to the respective pre-press positions.

In some embodiments, the loader plate includes a plurality of openings defined therein. Each opening of the plurality of openings passes through the loader plate is adapted for a respective comestible to move through the opening onto the surface, wherein the plurality of openings includes the opening. The comestible loader includes, for each of the one or more of the plurality of openings, a respective first flattener and a respective second flattener each of which are pivotably and translationally attached to the loader plate at the respective opening.

In some embodiments, the system includes a loading tube aligned over the opening in the loader plate.

In some embodiments, the system includes the surface. The surface comprises a conveyor. The system includes a press that includes a pressing pattern location and is adapted to form the comestible when the comestible substantially aligns with the pressing pattern location. The conveyor is adapted to move the comestible when the comestible is approximately at the target position on the conveyor to a position in the press that substantially aligns with the pressing pattern location. The system can include a spacer in the press at the pressing pattern location.

In some embodiments, the first flattener is attached to the loader plate on a first side of the opening and the second flattener is attached to the loader plate on a second side of the opening opposite the first side.

In some embodiments, the system includes one or more second actuators coupled to the loader plate and adapted to vertically translate the first flattener and the second flattener to cause the first flattener and the second flattener to position the comestible approximately at the target position on the surface, wherein the one or more actuators are i) coupled to the first flattener, and the second flattener, and ii) adapted to pivot and horizontally translate the first flattener and the second flattener to cause the first flattener and the second flattener to support the comestible within the opening and position the comestible approximately at the target position on the surface.

In some embodiments, the system includes a third flattener and a fourth flattener pivotably attached to the loader plate at the opening, wherein the one or more actuators are adapted to pivot the third flattener and the fourth flattener to position the comestible approximately at the target position on the surface. The third flattener and the fourth flattener are pivotably and translationally attached to the loader plate at the opening.

Another aspect of the present disclosure features a method including receiving, by a comestible loader, a comestible through an opening defined in a loader frame of the comestible loader and onto a surface, and pivoting and translating a first flattener and a second flattener to a pre-press position to permit the first flattener and the second flattener to position the comestible approximately at a target position on the surface.

In some embodiments, pivoting and translating the first flattener and the second flattener to the pre-press position includes pivoting, horizontally translating, and vertically translating the first flattener and the second flattener to the pre-press position to permit the first flattener and the second flattener to position the comestible approximately at a target position on the surface.

In some embodiments, pivoting, horizontally translating, and vertically translating the first flattener and the second flattener to the pre-press position includes pivoting, using a first actuator that is coupled to the first flattener and the second flattener, the first flattener and the second flattener; horizontally translating, using a second actuator that is coupled to the first flattener and the second flattener, the first flattener and the second flattener; and vertically translating, using a third actuator that is coupled to the loader frame, the loader frame that is coupled to the first flattener and the second flattener to cause vertical translation of the first flattener and the second flattener.

In some embodiments, receiving the comestible includes receiving the comestible through the opening defined in the loader frame of the comestible loader and onto each of the first flattener and the second flattener, the first flattener and the second flattener positioned in a closed position; and before pivoting and translating the first flattener and the second flattener to the pre-press position, pivoting the first flattener and the second flattener to an open position to allow the comestible to pass through the opening of the loader frame and onto a surface.

In some embodiments, receiving the comestible includes receiving, by the comestible loader at a first distance from the surface, the comestible, and lowering, by the comestible loader, the loader frame to a second distance from the surface that is smaller than the first distance after receiving the comestible and before pivoting the first flattener and the second flattener.

In some embodiments, receiving the comestible includes receiving the comestible onto each of the first flattener and the second flattener when the first flattener and the second flattener have a first distance between a first actuator coupling locations of the first flattener and second actuator coupling locations of the second flattener; and pivoting and translating the first flattener and the second flattener to the pre-press position to permit the first flattener and the second flattener to position the comestible approximately at the target position on the surface includes translating the first flattener and the second flattener to a second distance between the first actuator coupling locations of the first flattener and the second actuator coupling locations of the second flattener to permit the first flattener and the second flattener to position the comestible approximately at the target position, the second distance being a shorter distance than the first distance; and pivoting the first flattener and the second flattener to the pre-press position to pre-press the comestible approximately at the target position.

In some embodiments, the method includes pivoting, horizontally translating, and vertically translating the first flattener and the second flattener to a partial press position to permit the first flattener and the second flattener to flatten the comestible approximately centered at the target position on the surface.

In some embodiments, pivoting and horizontally translating the first flattener and the second flattener to the pre-press position to permit the first flattener and the second flattener to position the comestible approximately at a target position on the surface includes pivoting and horizontally translating the first flattener and the second flattener to the pre-press position that is a first distance from the surface. In some embodiments, pivoting, horizontally translating, and vertically translating the first flattener and the second flattener to the partial press position to permit the first flattener and the second flattener to flatten the comestible approximately centered at the target position on the surface includes pivoting, horizontally translating, and vertically translating the first flattener and the second flattener to a second distance from the surface that is greater than the first distance, and vertically translating the first flattener and the second flattener to the partial press position that is a third distance from the surface that is less than the second distance to permit the first flattener and the second flattener to flatten the comestible approximately centered at the target position on the surface.

In some embodiments, the first distance is substantially the same distance as the third distance; and vertically translating the first flattener and the second flattener to the partial press position comprises vertically translating the first flattener and the second flattener to the partial press position that is the first distance from the surface that is less than the second distance to permit the first flattener and the second flattener to flatten the comestible approximately centered at the target position on the surface In some embodiments, pivoting, horizontally translating, and vertically translating the first flattener and the second flattener to the partial press position to permit the first flattener and the second flattener to flatten the comestible approximately centered at the target position on the surface includes after vertically translating the first flattener and the second flattener to the partial press position, vertically translating the first flattener and the second flattener to approximately the second distance from the surface that is greater than the first distance to permit the surface to move the comestible out from under the loader frame.

In some embodiments, the method includes moving, by the surface, the comestible out from under the loader frame.

Another aspect of the present disclosure features a non-transitory computer storage medium encoded with instructions that, when executed by one or more computers, cause the one or more computers to perform, using a comestible loader, the methods described above.

Another aspect of the present disclosure features a system including one or more computers and one or more storage devices on which are stored instructions that are operable, when executed by the one or more computers, to cause the one or more computers to perform, using a comestible loader, the methods described above.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

The subject matter described in this specification can be implemented in various embodiments and may result in one or more of the following advantages. In some implementations, the systems and methods described in this document can improve system accuracy when processing comestibles. For example, the systems and methods described in this document can increase production speed of a comestible line of equipment and can increase a likelihood that a comestible is positioned at a target position or location on a surface, e.g., a conveyor. This can result in improved product profit, uniformity, reduced waste, or all three. In some implementations, the systems and methods described in this document can reduce a likelihood that comestible product will extrude between flatteners in a comestible loader. In some implementations, the systems and methods described in this document can reduce a likelihood that comestibles will be rejected because they do not conform with product processing parameters, they create a jam in a comestible system, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-D depict an example of a comestible loader with a loader plate and multiple openings with vertical actuator.

Like reference numbers and designations in the various drawings indicate like elements.

DETAILED DESCRIPTION

Figure 1:
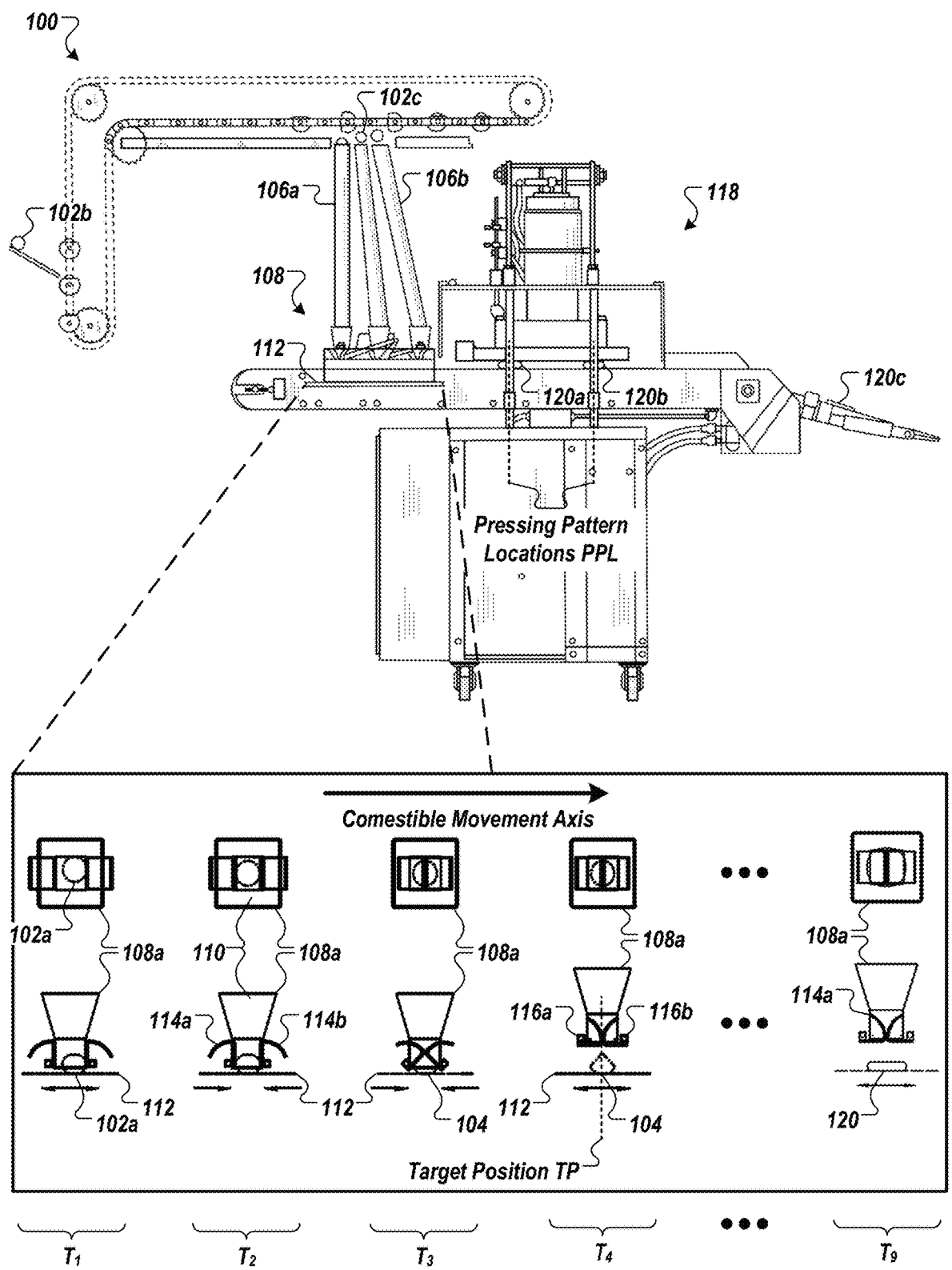
FIG. 1 depicts an example comestible system.

FIG. 1 depicts an example comestible system 100. The comestible system 100 can process unformed comestibles 102a-c, such as dough balls, by placing the unformed comestibles 102a-c on a surface 112, such as a conveyor 112, that is included in the comestible system 100. In some examples, the comestibles 102a-c can be flour based dough balls.

The conveyor 112 can move the unformed comestibles 102a-c forward through the comestible system 100 and into a press 118. The press 118 can form the unformed comestibles 102a-c and create formed comestibles 120a-c, e.g., unbaked flatbread. For instance, the press 118 can form the unformed comestibles 102a-c by moving to a lower position at which the press 118 applies pressure, heat, or both, to the unformed comestibles 102a-c to create the formed comestibles 120a-c. The formed comestibles 120a-c can be further processed, such as baked in an oven, cooled in a cooler, and packaged in a bagger, as described in more detail below. The conveyor 112 can couple with a frame. The frame can couple with, or otherwise be part of, the press 118.

Some comestible systems 100 can have threshold comestible parameters, such as a comestible size within a threshold comestible size range, comestible coloring requirements, and the like. To improve a likelihood that comestibles processed by the comestible system 100 have parameters that satisfy the threshold comestible parameters, such as a comestible size within a threshold comestible size range, roundness or shape, the comestible system 100 can use a comestible loader 108, coupled to the frame, that has one or more openings 110 in a loader plate 108a. The comestible loader includes two or more flatteners 114a-b, each adapted to move at least partially within a corresponding opening 110. The comestible system 100 can use the flatteners 114a-b to more accurately position an unformed comestible 102a on the conveyor at a target position TP after the unformed comestible 102a falls through a corresponding opening 110.

The target position TP can approximately align with a center of a pressing pattern location PPL in the press 118 after the conveyor 112 moves the unformed comestible 102a through the comestible system 100. For example, the conveyor 112 can move the unformed comestible 102a, placed at the target position TP, forward through the comestible system 100 until the unformed comestible 102a is in the press 118. The conveyor 112 can move the unformed comestible 102a at the target position TP to a location that substantially aligns with the center of the pressing pattern location PPL in the press 118.

As described in more detail below, the pressing pattern location PPL can correspond to a location at which the press 118 can include a spacer. For instance, when the press 118 includes a spacer at the pressing pattern location PPL, the center of the pressing pattern location PPL can approximately align with a center of the spacer, e.g., when the spacer is circular or rectangular or any other appropriate shape.

Substantially aligning the target position TP on the conveyor 112 with the pressing pattern location PPL in the press 118 can improve product uniformity because, when the press 118 includes a spacer at the pressing pattern location PPL, the spacer can uniformly apply pressure and heat to the unformed comestible 102a-c to create a formed comestible 120a-c. The uniform application of heat and pressure can cause the press to evenly distribute comestible product from the unformed comestible 102a-c around the substantially aligned target position TP and the pressing pattern location PPL.

The flatteners 114a-b are coupled to one or more actuators 116a-b that can translate the flatteners substantially horizontally from an outer position to an inner position, as described in more detail below with reference to FIGS. 3A-B. In this document, reference to horizontal translation can mean translation that is horizontal, substantially horizontal, or translation that includes at least some horizontal movement, e.g., and may include some vertical movement. In some examples, the one or more actuators 116a-b can translate the flatteners from the outer position to the inner position.

For instance, with reference to FIG. 1, during a time period, such as $T_1$, the actuators 116a-b can position the flatteners 114a-b in the open, outer position. The outer position is represented by the outward pointing arrows. The open position is represented by the tips of the flatteners 114a-b pointing upward. This can enable the comestible 102a to fall through the opening 110 and onto the conveyor 112.

During time period $T_2$, the actuators 116a-b can position the flatteners 114a-b in an open, inner position, the latter of which is represented by the inward pointing arrows. Then, during time period $T_3$, the actuators 116a-b can rotate the flatteners 114a-b into a pre-press position at which the flatteners 114a-b create a pre-pressed comestible 104 from the unformed comestible 102a. The pre-press position is represented by the flatteners 114a-b angled toward each other, with the inner tips of the flatteners 114a-b within a threshold distance from each other, e.g., touching. During time period $T_3$, the actuators 116a-b can maintain the flatteners 114a-b in the inward position.

Once the pre-pressed comestible 104 is formed, the actuators 116a-b can move the flatteners 114a-b back into the outer position during time period $T_4$. The actuators 116a-b can also move the flatteners 114a-b into a closed position in which the two flatteners 114a-b are pointing toward each other. This can enable the flatteners 114a-b to receive another unformed comestible, as discussed in more detail below. The sequencing of the flatteners can continue through time period $T_9$, which will be discussed in further detail below with respect to FIGS. 3A and 3B. For example, the flatteners 114a-b, optionally with one or more other components of the comestible system 100 such as the loader plate 108a, can form the partially pressed comestible 122.

Creation of the pre-pressed comestible 104 can reduce a likelihood that a comestible will disengage from the conveyor 112 during movement of the conveyor. For example, the flatteners 114a-b can create the pre-pressed comestible 104 that has a substantially flat lower surface that is less likely to roll or otherwise move along the conveyor 112 than the unformed comestibles 102a-c.

This form for the pre-pressed comestible 104 can be created because the flatteners 114a-b both rotate and horizontally translate. For instance, the one or more actuators 116a-b can horizontally translate each of the flatteners 114a-b in a respective direction that is substantially parallel to the conveyor 112. The actuators 116a-b can horizontally translate a first flattener 114a in a direction along a comestible movement axis away from the press 118 and can horizontally translate a second flattener 114b in a direction along the comestible movement axis toward the press 118.

The comestible system 100 can include one or more loading tubes 106a-b. The one or more loading tubes 106a-b can transfer unformed comestibles 102a-c from another portion of the comestible system 100, such as another conveyor, through the openings 110 in the loader plate 108a. The comestible system 100 can include multiple openings 110 in the loader plate 108a, each of which correspond to one of the loading tubes 106a-b. The number of openings 110, and loading tubes 106a-b, can correspond to a pressing pattern layout for comestibles in the comestible system 100. Some examples pressing pattern layouts include 2×2, 3×3, 4×4, 4×5, 5×5, 5×6, 6×6, 7×7 and 8×8.

When the comestible system 100 has a 3×3 pressing pattern layout, the comestible system 100 can include a 3×3 grid of loading tubes 106a-b and a 3×3 grid of openings 110 in the loader plate 108a such that each of the openings 110 is positioned below one of the loading tubes 106a-b. Each of the loading tubes 106a-b is positioned above one of the openings 110. This can enable the comestible system 100 to move an unformed comestible 102a through a loading tube 106a-b, through an opening 110, and onto the conveyor 112. The comestible system 100 can then position the unformed comestible 102a substantially at the target position TP using the flatteners 114a-b.

Figure 2:
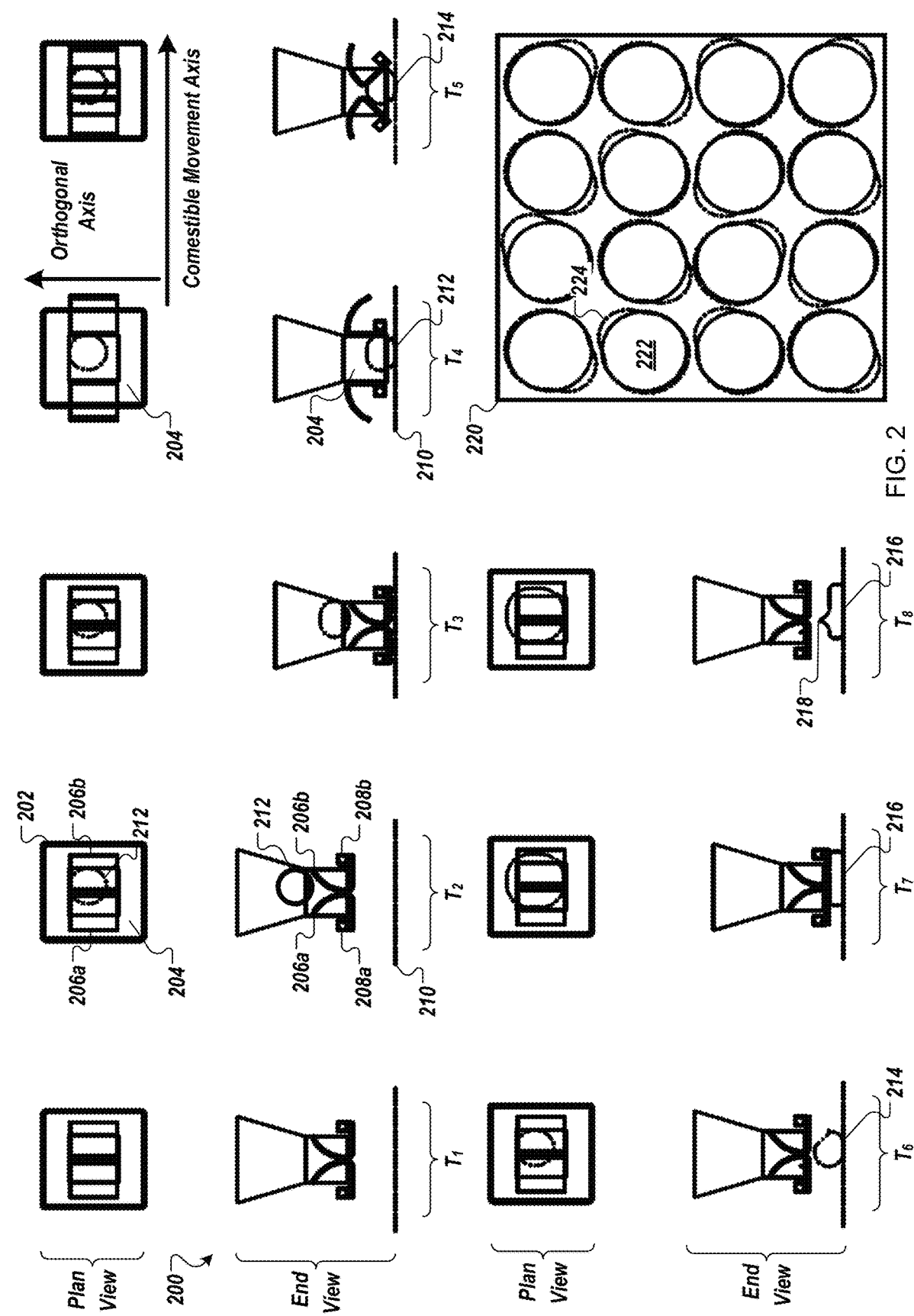
FIG. 2 depicts an example comestible loader with flatteners that rotate but do not translate in a substantially horizontal direction.

FIG. 2 depicts an example comestible loader 200 with flatteners 206a-b that rotate but do not translate in a horizontal direction. The comestible loader 200 includes a loader plate 202 and an opening 204 through the loader plate 202. Although FIG. 2 depicts the opening 204 with a square shape, the opening 204 can have any appropriate shape, such as a circle or a rectangle. In some examples, the opening 204 can have a rectangular shape with a length along a comestible movement axis that is greater than a width along an orthogonal axis that is substantially perpendicular to the comestible movement axis along a plan substantially parallel to a surface 210 that supports a comestible product. The surface 210 can be a conveyor or any other appropriate type of surface.

The loader plate 202 couples with the two or more flatteners 206a-b. For example, the loader plate 202 couples with the two or more flatteners 206a-b using one or more rotational actuators 208a-b. The rotational actuators 208a-b couple with, and rotate, the flatteners 206a-b but cannot translate the flatteners 206a-b horizontally. The flatteners 206a-b are adapted to move at least partially positioned within the opening 204.

During time period $T_1$, the flatteners 206a-b are in a closed position and spaced apart from the surface 210. This closed position can enable the flatteners 206a-b to receive a comestible 212 during time period $T_2$. For instance, the flatteners 206a-b can receive the comestible 212 on respective upper surfaces of the flatteners after the comestible moves through a loading tube.

During time period $T_3$, the comestible loader 200 vertically moves the loader plate 202 including the flatteners 206a-b, which are in the closed position, to a position near the surface 210. For example, the comestible loader 200 can include one or more second actuators that move the loader plate 202 vertically to a position that is approximately adjacent to the surface 210, e.g., within a threshold distance from the surface 210. The one or more second actuators vertically move the loader plate 202 itself, and not just the flatteners 206a-b that are coupled to the loader plate 202.

The loader plate 202 can include multiple openings 204, such as sixteen openings 204 in a four by four layout that corresponds to a pressing patterns layout 220. When the loader plate 202 includes multiple openings 204, the second actuators vertically move the entire loader plate 202 that includes the multiple openings 204 to a position near the surface 210. Two flatteners 206a-b are adapted to move at least partially within each of the multiple openings 204 and couple with the loader plate 202.

During time period $T_4$, the comestible loader 200 moves the flatteners 206a-b to an open position using the actuators 208a-b. For example, the actuators 208a-b can rotate the flatteners 206a-b to the open position. Opening the flatteners 206a-b can cause the comestible 212 to fall through the opening 204 and onto the surface 210.

Once the comestible 212 is on the surface 210, the comestible loader 200 can rotate the flatteners 206a-b to create a pre-pressed comestible 214 during time period $T_5$. For instance, the comestible loader 200 can cause the one or more actuators 208a-b to rotate the flatteners 206a-b to a pre-press position. The comestible loader 200 can determine the pre-press position using a time period of rotation. The time period of rotation can be specified by the pressing recipe, e.g., as a parameter for the pressing recipe. One or more lower surfaces of the flatteners 206a-b can contact the comestible 212 to create the pre-pressed comestible approximately aligned with the TP 214.

As shown in FIG. 2, there is a gap between the flatteners 206a-b when the flatteners 206a-b are in the pre-press position. Further, the pre-pressed comestible 214 might not be substantially centered between the two flatteners 206a-b, resulting in the right side of the pre-pressed comestible 214 being pressed more than the left side. For example, a larger first area of the lower surface of the right flattener 206b contacts the comestible 212 to create the pre-pressed comestible 214 than a smaller second area of the lower surface of the left flattener 206a.

During time period $T_6$, the comestible loader 200 can position the flatteners 206a-b in the closed position and vertically move the loader plate 202 upward away from the surface 210. For instance, the comestible loader 200 can use the one or more actuators 208a-b to rotate the flatteners 206a-b from the pre-press position to the closed position. The comestible loader 200 can use the one or more second actuators to vertically move the loader plate 202 upward away from the surface 210. The vertical movement can be specified by the pressing recipe, e.g., as a parameter for the pressing recipe.

The comestible loader 200 can then, during time period $T_7$, partially press the pre-pressed comestible 214 to create a partially pressed comestible 216. For example, the comestible loader 200 can use the one or more second actuators to vertically move the loader plate 202 downward, toward the surface, to create the partially pressed comestible 216.

During time period $T_7$, the comestible loader 200 can vertically move the loader plate 202 upward away from the surface 210 leaving the partially pressed comestible 216 on the surface 210. This can allow the surface 210 to move the partially pressed comestible 216 to a press or another device in the system. For instance, when the surface 210 is a conveyor, one or more third actuators coupled to the conveyor can rotate the conveyor to move the partially pressed comestible 216 to a position in a press.

Because the comestible 212 was not completely centered within the opening 204, the partially pressed comestible 216 might have a point 218 that is not centered within the partially pressed comestible 216. For example, the point 218 can be slightly to the left of the center of the partially pressed comestible 216, which creates misalignment with the TP and the PPL.

When the partially pressed comestible 216 is part of a pressing pattern layout 220, and pressed at a comestible press, the partially pressed comestible 216 can result in a pressed comestible with a protrusion 224 that extends outside a comestible shape 222 for the pressing pattern layout 220. This can result in a non-conforming comestible that is later rejected from a comestible system, and waste because the non-conforming comestible is not sold downstream. Further, this can result in wasted energy when a comestible system processes the non-conforming comestible that is later rejected when that energy could have been used to process a conforming comestible that satisfies threshold comestible parameters for the pressing pattern layout 220.

In some examples, the comestible shape 222 is one of the threshold comestible parameters for the pressing pattern layout 220. The comestible shape 222 can correspond to a spacer size, pressing pattern location in the pressing pattern layout 220, or both. For instance, when the press has spacers at one or more locations represented by the pressing pattern layout, the spacer for a comestible at the corresponding location can be slightly smaller than the comestible shape 222, slightly larger than the comestible shape 222, or approximately the same size as the comestible shape 222.

One or more of the time periods can overlap, partially or completely. In some examples, one or more of the time periods do not overlap. For example, the time period $T_1$ and the time period $T_2$ can at least partially overlap. In some instances, the time period $T_3$ and the time period $T_4$ can at least partially overlap.

Figure 3A:
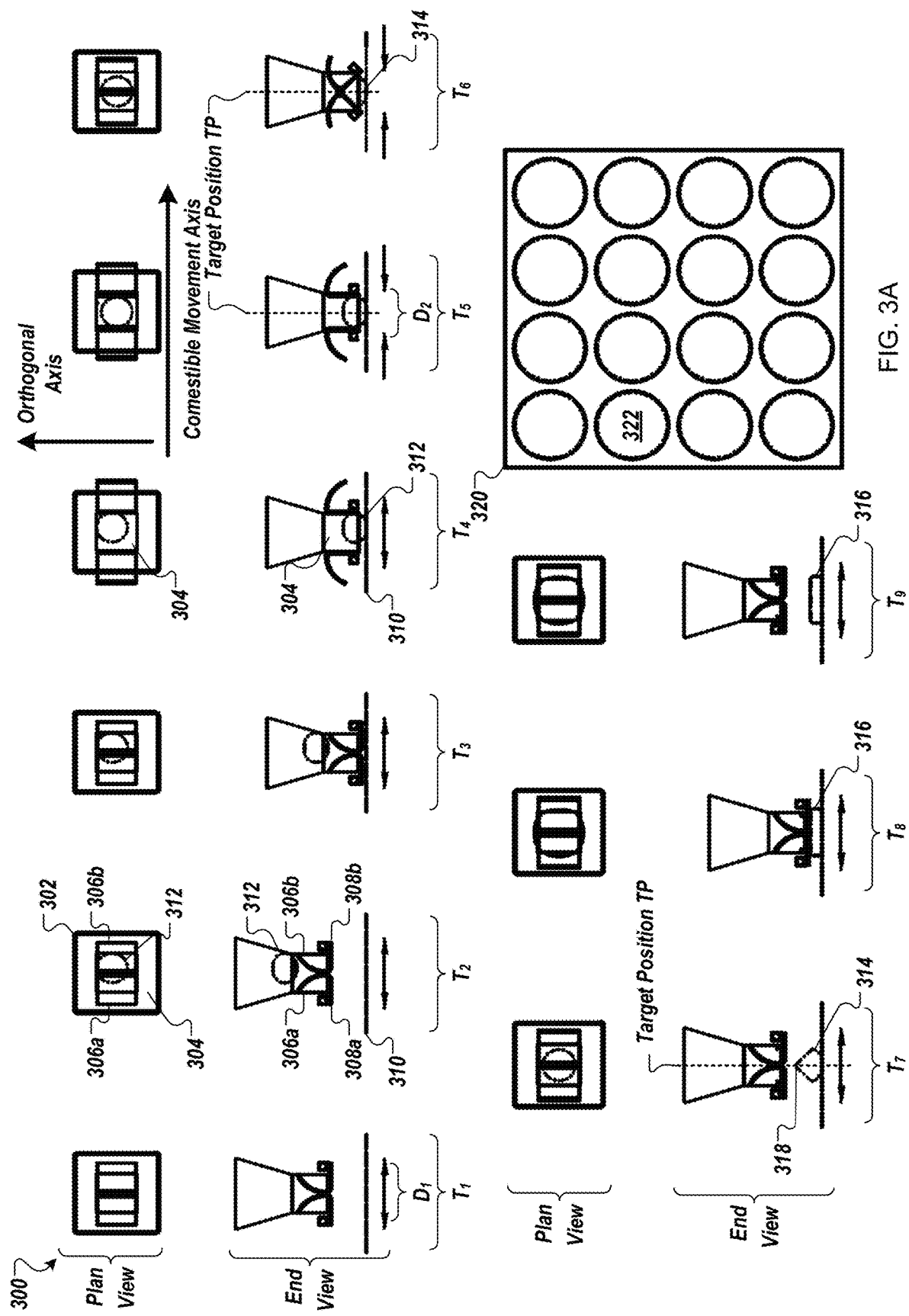
FIGS. 3A-B depict an example comestible loader with flatteners that rotate and substantially horizontally translate.
Figure 3B:
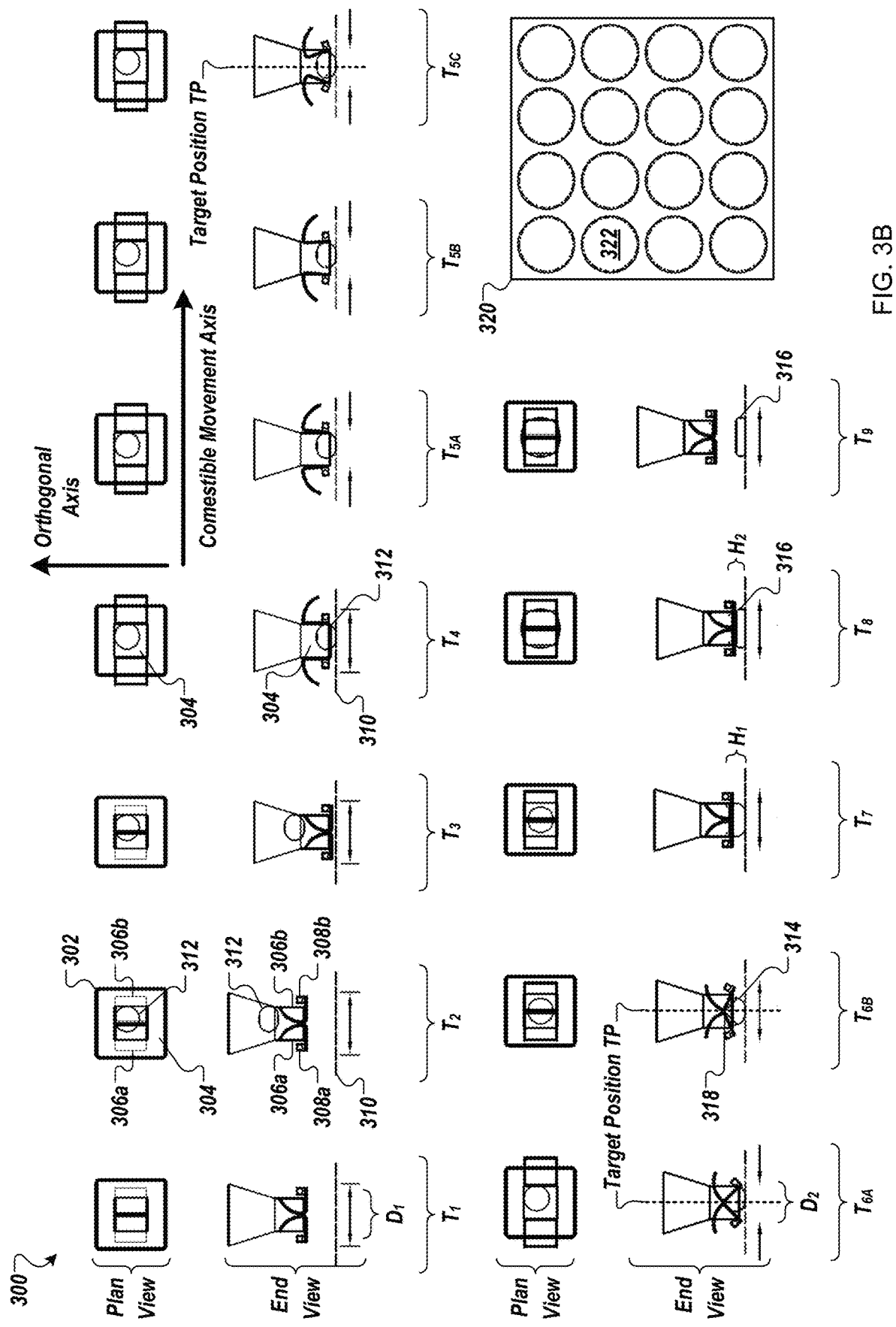

FIGS. 3A-B depict an example comestible loader 300 with flatteners 306a-b that rotate and horizontally translate. The comestible loader 300 includes a loader plate 302 with an opening 304. Although FIGS. 3A-B depict the opening 304 with a square shape, the opening 304 can have any appropriate shape, such as a circle or a rectangle. In some examples, the opening 304 can have a rectangular shape with a length along a comestible movement axis that is greater than a width along an orthogonal axis that is substantially perpendicular to the comestible movement axis along a plan substantially parallel to a surface 310 that supports a comestible product.

The comestible loader 300 is coupled to two flatteners 306a-b. The comestible loader 300 can couple to the flatteners 306a-b using one or more actuators 308a-b. The actuators 308a-b can rotate and horizontally translate the flatteners 306a-b. The translation is in a substantially horizontal direction, e.g., parallel to a surface 310. In some examples, the comestible loader is coupled to one or more first actuators that horizontally translate the flatteners 306a-b and one or more second actuators that rotate the flatteners 306a-b. The surface 310 can be any appropriate type of surface to receive a comestible 312, such as a conveyor.

During time period $T_1$, the comestible loader 300 maintains, e.g., positions, the loader plate 302 at a first position spaced apart from the surface 310. While in the first position, the loader plate 302 is adapted to receive the comestible 312 within the opening 304 during time period $T_2$. For instance, the loader plate 302 can receive the comestible 312 on an upper surface of the flatteners 306a-b during time period $T_2$. During time periods $T_1$, $T_2$, $T_3$, and $T_4$, the one or more actuators 308a-b have the flatteners 306a-b positioned in an outer position, represented by the outward facing arrows.

As referred to in this document, the inner position and the outer position can refer to a distance between two reference positions. The two reference positions can be positions of axles included in the flatteners 306a-b, positions at which the actuators 308a-b couple with the flatteners 306a-b, some other appropriate position on the flatteners 306a-b, or a combination of two or more of these. The inner position includes the reference positions closer to each other than the outer position. For instance, the outer position includes the reference positions at a distance $D_1$ apart that is a greater distance than a distance $D_2$ between the reference positions in the inner position.

The actuators 308a-b can include an axle coupled to one or more valves and to least one of the flatteners 306a-b. The actuators 308a-b can use a first valve to rotate the axle, which rotation causes the rotation of the flatteners 306a-b. The actuators 308a-b can use a second valve, which can be the same valve as or a different valve from the first valve, to horizontally translate the axles from the outer position to the inner position and back. This translation of the axles can cause the flatteners 306a-b to horizontally translate between the outer position and the inner position.

The distances used for the inner position, the outer position, or both, can be parameters included in a process recipe for the comestibles being processed by the comestible loader 300, predetermined parameters, or both. For instance, a first process recipe can have a first, narrower inner distance for a first comestible size compared to a second process recipe that has a second, wider inner distance for a second comestible size that is larger size than the first comestible size. Similarly, the first process recipe can have a first narrower outer distance for the first comestible size compared to the second process recipe that has a second, wider outer distance for the second comestible size. The first, narrower inner distance is a smaller distance than the first, narrower outer distance. The second, wider inner distance is a smaller distance than the second, wider outer distance.

In some implementations, the inner position, the outer position, or both, are based on the loader plate 302 to which the flatteners 306a-b are coupled, a comestible weight, a comestible size, or a combination of two or more of these. For instance, a first loader plate 302 can have a first pressing pattern layout, e.g., 3×3, and a second loader plate 302 can have a second pressing pattern layout, e.g., 6×6. For the first loader plate, the flatteners coupled to the first loader plate can have a first inner distance and a first outer distance. For the second loader plate, the flatteners coupled to the second loader plate can have a second, different inner distance and a second, different outer distance.

In some implementations, when the loader plate 302 includes two or more openings, each of which has corresponding flattener pairs, some of the flattener pairs can have a different inner distance, a different outer distance, or both, compared to the other flattener pairs. For instance, a first flattener pair can have a first inner distance, a first outer distance, or both. A second flattener pair can have a second, different inner distance, a second, different outer distance, or both.

In some implementations, when the loader plate 302 is used with different process recipes, the inner distance, the outer distance, or both, can be different for the different process recipes. For example, when the loader plate 302 is used for a first process recipe for a comestible with a first weight, the flatteners can have a first inner distance and a first outer distance. When the loader plate 302 is used for a second, different process recipe for a comestible with a second, different weight, the flatteners can have a second, different inner distance, a second, different outer distance, or both.

In some implementations, the comestible loader 300 can position the flatteners 306a-b in one or more intermediate positions between the inner position and the outer position. For instance, as described in more detail below, during one or more of the time periods $T_{5A-C}$, the comestible loader can move the flatteners 306a-b from the outer position, at which the flatteners were located during time period $T_4$, and to the inner position during time period $T_{6A-B}$, as described in more detail below.

During time period $T_3$, the comestible loader 300 optionally vertically moves the loader plate 302 to a position near to the surface 310. For instance, other actuators included in the comestible loader 300 can move the loader plate 302 to the position within a threshold distance of the surface 310.

The one or more actuators 308a-b can rotate the flatteners 306a-b to an open position during time period $T_4$. This can cause the comestible 312 to move through the opening 304 and onto the top of the surface 310. For example, when the flatteners 306a-b rotate to the open position, caused by actuation of the one or more actuators 308a-b, the movement of the flatteners 306a-b can cause the comestible 312 to fall onto the top of the surface 310.

As shown in FIG. 3A, during time period $T_5$, the one or more actuators 308a-b horizontally translate the flatteners 306a-b to an inner position. The actuators 308a-b can translate the flatteners 306a-b in a substantially horizontal direction. The inner position is represented by the inward point arrows in FIG. 3A, and similarly in FIG. 3B. This translation can cause the comestible 312 to become approximately centered within the opening 304. This can include centering the comestible 312 along a comestible movement axis and approximately at the target position TP.

For instance, during time period $T_4$, the comestible can be off center when it falls onto the surface 310. To correct for this off center position, the one or more actuators 308a-b can horizontally translate the flatteners to the inner position with a reference position a distance $D_2$ apart to cause the comestible to move to a position that is approximately centered within the opening 304 along the comestible movement axis to better align with TP and PPL.

The distance $D_2$ between the reference positions for the flatteners 306a-b at the inner position can be selected based on an approximate size of the comestible 312. For example, when threshold comestible parameters for a pressing pattern layout indicate a predetermined size range for the comestible 312, e.g., a predetermined diameter range for the comestible 312, the distance $D_2$ between the reference positions for the flatteners 306a-b can be the maximum value from the predetermined size range or another appropriate value for the predetermined size range.

In some implementations, the comestible loader 300 need not center the comestible 312 along an orthogonal axis that is perpendicular to the comestible movement axis in a plane that is substantially parallel to the surface 310. For instance, the sides of the opening 304 in the loader plate 302 along the orthogonal axis can be positioned so that the comestible 312 has less than a threshold amount of movement along the orthogonal axis. This can include the sides of the opening 304 along the orthogonal axis being positioned approximately at a distance defined by the maximum value for predetermined size range or another appropriate value for the predetermined size range.

In some implementations, the comestible loader 300 can include one or more flatteners that position the comestible 312 along the orthogonal axis. These one or more flatteners can horizontally translate in a direction substantially perpendicular to the direction in which the flatteners 306a-b horizontally translate. The one or more flatteners can be coupled to corresponding actuators that cause the horizontal translation of the one or more flatteners. In some examples, the corresponding actuators, or additional actuators, can rotate the one or more flatteners along the orthogonal direction. For example, the one or more flatteners can have movement as described with reference to the flatteners 306a-b.

During time period $T_6$, the comestible loader 300 can rotate the flatteners 306a-b to a pre-press position. For instance, the comestible loader 300 can cause the one or more actuators 308a-b to rotate the flatteners 306a-b to the pre-press position to create a pre-pressed comestible 314 from the comestible 312. In general, the comestible loader 300 can cause the actuators 308a-b to move the flatteners 306a-b by sending a signal to the actuators 308a-b. At the pre-press position, the flatteners 306a-b can have an angle, e.g., with respect to the surface 310, that is specified by a pressing recipe. For instance, the pressing recipe can include a parameter that indicates a pre-press angle for the flatteners 306a-b. The pre-press angle can be based on a size of a comestible 312 that moves through the comestible loader 300. For instance, the pre-press angle can be larger for a larger comestible 312 and smaller for a smaller comestible 312, e.g., when the comestible size is based on a comestible diameter. In some examples, the pre-press angle can be based on a size of the opening 304. For example, the pre-press angle can be larger for a larger opening 304 size and smaller for a smaller opening 304 size. In some implementations, the pre-press angle can be based on both a comestible 312 size and an opening 304 size.

When in the pre-press position, one or more surfaces of the flatteners 306a-b can come into contact. For example, a first bottom edge of a first left flattener 306a can contact a second bottom edge of a second right flattener 306b. If the flatteners 306a-b could not translate horizontally, the flatteners 306a-b would not be able to contact while in the pre-press position, or to otherwise come within a threshold distance of each other while in the pre-press position.

The pre-pressed comestible 314 can include a point 318 that substantially aligns with the target position TP. For example, during time period $T_7$, the comestible loader 300 can vertically move the loader plate 302 in an upward direction, e.g., using the other actuators, away from the surface 310. During this time period, the comestible loader 300 can use the actuators 308a-b to rotate and translate the flatteners 306a-b to the closed position with the flatteners 306a-b in the outer position. As shown with respect to time period $T_7$, the pre-pressed comestible 314 has a point 318 that substantially aligns with the target position TP.

During time period $T_8$, the comestible loader 300 can vertically move the loader plate 302 in a downward position to create the partially pressed comestible 316 from the pre-pressed comestible 314. This can include the comestible loader 300 moving to a partial press position. The other actuators included in the comestible loader 300, which are coupled to the loader plate 302, can vertically move the loader plate 302 in the downward direction toward the surface 310 to create the partially pressed comestible 316. This vertical timing and stroke distance to the stopping point at $T_8$ can be a separate parameter of the loader 300. The comestible loader 300 can then vertically move the loader plate 302 upward, e.g., using the other actuators, during the time period $T_9$. This can cause the loader plate 302 to move upward, away from the surface 310.

As a result of the horizontal translation of the flatteners 306a-b described above, the partially pressed comestible 316 can have a size that substantially aligns with a comestible shape 322 for the pressing pattern layout 320 used for the comestible 312, 314, 316, e.g., without a protrusion, such as the protrusion 224 described above with reference to FIG. 2. For instance, when the comestible loader 300 uses the one or more actuators 308a-b that can horizontally translate the flatteners 306a-b, coupled with the control parameter of loader 300 vertical position and stopping point, the comestible loader can increase a likelihood that comestibles processed with the comestible loader 300 are centered on the target position TP, have a size that is within threshold size range for the pressing pattern layout 320, substantially align with a PPL pressing pattern location in a press, do not include any protrusions, or a combination of these.

In some implementations, as shown in FIG. 3B, the comestible loader 300 can move the flatteners 306a-b using multiple actuators at substantially the same time, e.g., during the time period $T_{5A-C}$. For instance, the comestible loader 300 can use a combination of two or more of a first actuator to rotate the flatteners 306a-b, a second actuator to horizontally translate the flatteners 306a-b, or a third actuator to vertically translate the flatteners 306a-b. The first actuators, the second actuators, and the third actuators can be separate actuators, some combination of a single actuator, e.g., when the first and the second actuators are the same and separate from the third actuators, or only a single actuator.

In some examples, one or more of the actuators can include at least some of the same parts. For instance, as described in more detail below, the first actuator can include a first valve that couples to axles 308a-b. The second actuator can include a second, different value that couples to the axles 308a-b. The third actuator can include a third, different valve that couples to the loader plate 302.

During the time period $T_{5A}$, the actuators 308a-b can begin to horizontally translate the flatteners 306a-b to the inner position as indicated by the directional arrows. The actuators 308a-b can horizontally translate the flatteners 306a-b to a location that is between the inner position and the outer position during the time period $T_{5A}$. For instance, at the beginning of the time period $T_{5A}$, the flatteners 306a-b can be positioned at the outer position. At the end of the time period $T_{5A}$, the flatteners 306a-b can be positioned at the location between the inner position and the outer position.

During time period $T_{5B}$, the actuators 308a-b can begin to rotate the flatteners 306a-b. The actuators 308a-b can continue to horizontally translate the flatteners 306a-b while rotating the flatteners 306a-b. For instance, a first actuator can rotate the flatteners 306a-b while a second actuator horizontally translates the flatteners 306a-b. During the time period $T_{5B}$ the flatteners 306a-b can be positioned at one or more locations between the inner position and the outer position.

During time period $T_{5C}$, the actuators 308a-b can continue to rotate, horizontally translate, or both, the flatteners 306a-b. For instance, the first actuator can rotate the flatteners 306a-b during the time period $T_{5C}$. The second actuator can horizontally translate the flatteners 306a-b during the time period $T_{5C}$. During the time period $T_{5C}$ the flatteners 306a-b can be positioned at one or more locations between the inner position and the outer position, e.g., and closer together than the reference positions were during the timer period $T_{5B}$.

The actuators 308a-b can place the flatteners 306a-b in the pre-press position during time period $T_{6A}$. In the pre-press position, the flatteners 306a-b can be located at the inner position. In some examples, in the pre-press position, a portion of the surface of each of the flatteners 306a-b can come into contact. For example, a first bottom edge of a first left flattener 306a can contact a second bottom edge of a second right flattener 306b. If the flatteners 306a-b could not translate horizontally, the flatteners 306a-b would not be able to contact while in the pre-press position, or to otherwise come within a threshold distance of each other while in the pre-press position.

During time period $T_{6B}$, actuators can vertically translate the loader plate 302, the actuators 308a-b can rotate the flatteners 306a-b, the actuators 308a-b can horizontally translate the flatteners 306a-b, or a combination of two or more of these. For instance, the third actuators coupled to the loader plate 302 can vertically translate the loader plate while, substantially concurrently, the first actuators rotate the flatteners 306a-b. This can increase a likelihood that the pre-pressed comestible 314 is at the target position TP on the surface 310.

In some examples, the second actuators can horizontally translate the flatteners 306a-b to the outer position during time period $T_{6B}$. The second actuators can fully or partially translate the flatteners 306a-b to the outer position. For instance, the second actuators can begin to translate the flatteners 306a-b from the inner position to the outer position during time period $T_{6B}$. The second actuators can finish horizontally translating the flatteners 306a-b to the outer position during time period $T_7$.

During time period $T_7$, the actuators 308a-b can rotate the flatteners 306a-b to the closed position. While in the closed position during time period $T_7$, the actuators 308a-b can be at a first, greater height $H_1$ from the surface 310.

During time period $T_8$, actuators can move the loader plate 302 downward toward the surface 310. The actuators, e.g., the third actuators, can move the loader plate vertically to create the partially pressed comestible 316. The actuators can move the loader plate to a second, smaller height $H_2$ from the surface 310.

The comestible loader 300 can then vertically move the loader plate 302 upward and away from the surface 310 during the time period $T_9$. The comestible loader 300 can use the third actuators to move the loader plate 302 upward during the time period $T_9$.

One or more of the time periods described with reference to FIGS. 3A-B can overlap, partially or completely. In some examples, some of the time periods might not overlap. For example, the time periods $T_5$ and $T_6$ or one or more of $T_{5A-C}$ and one or more of $T_{6A-B}$ can at least partially overlap. In some examples, the time periods $T_4$ and $T_5$ or $T_4$ and one or more of $T_{5A-C}$ can at least partially overlap. In some instances, the time periods $T_7$ and $T_8$ can at least partially overlap.

Figure 4A:
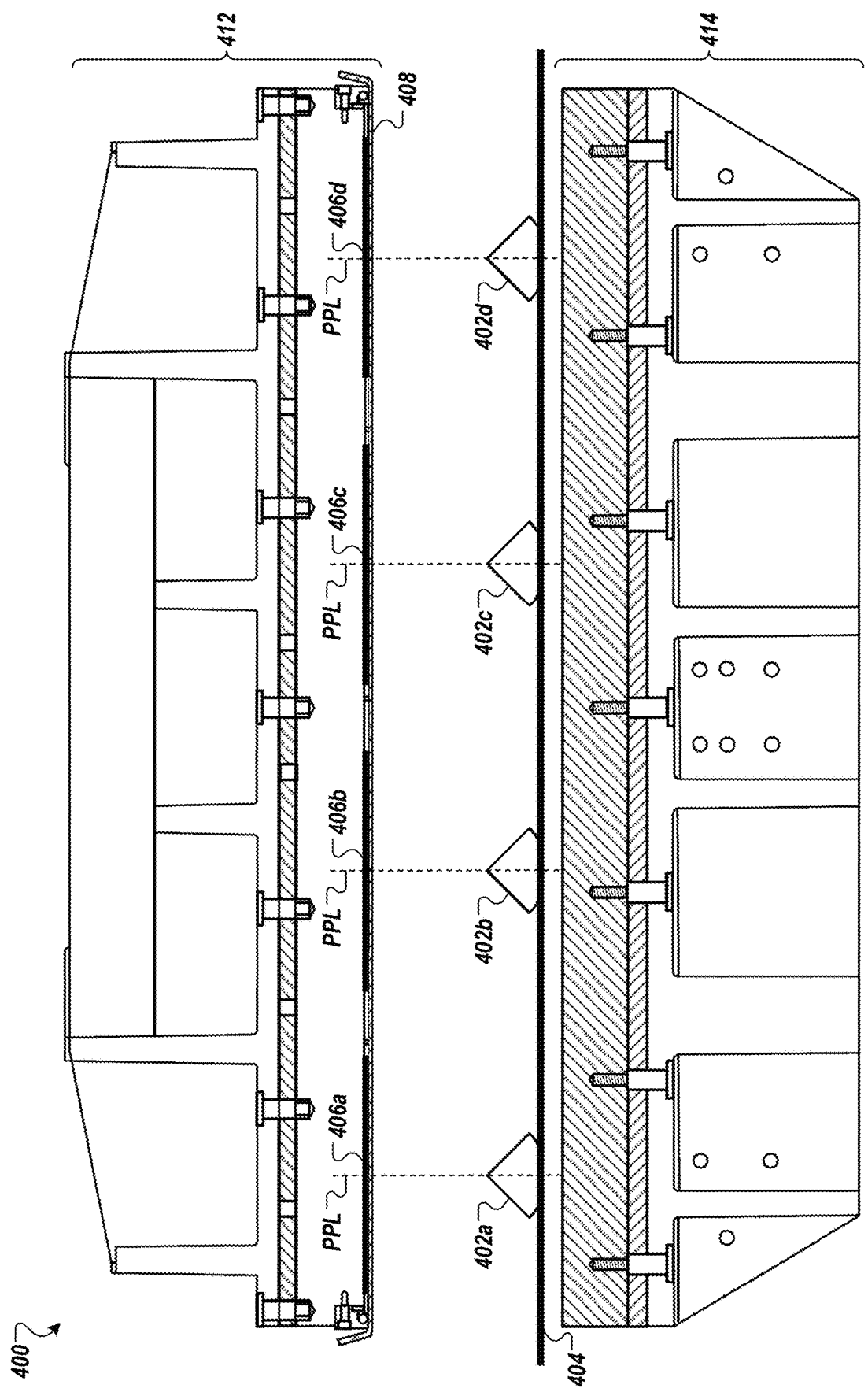
FIGS. 4A-B depict an example of a press for processing comestibles.
Figure 4B:
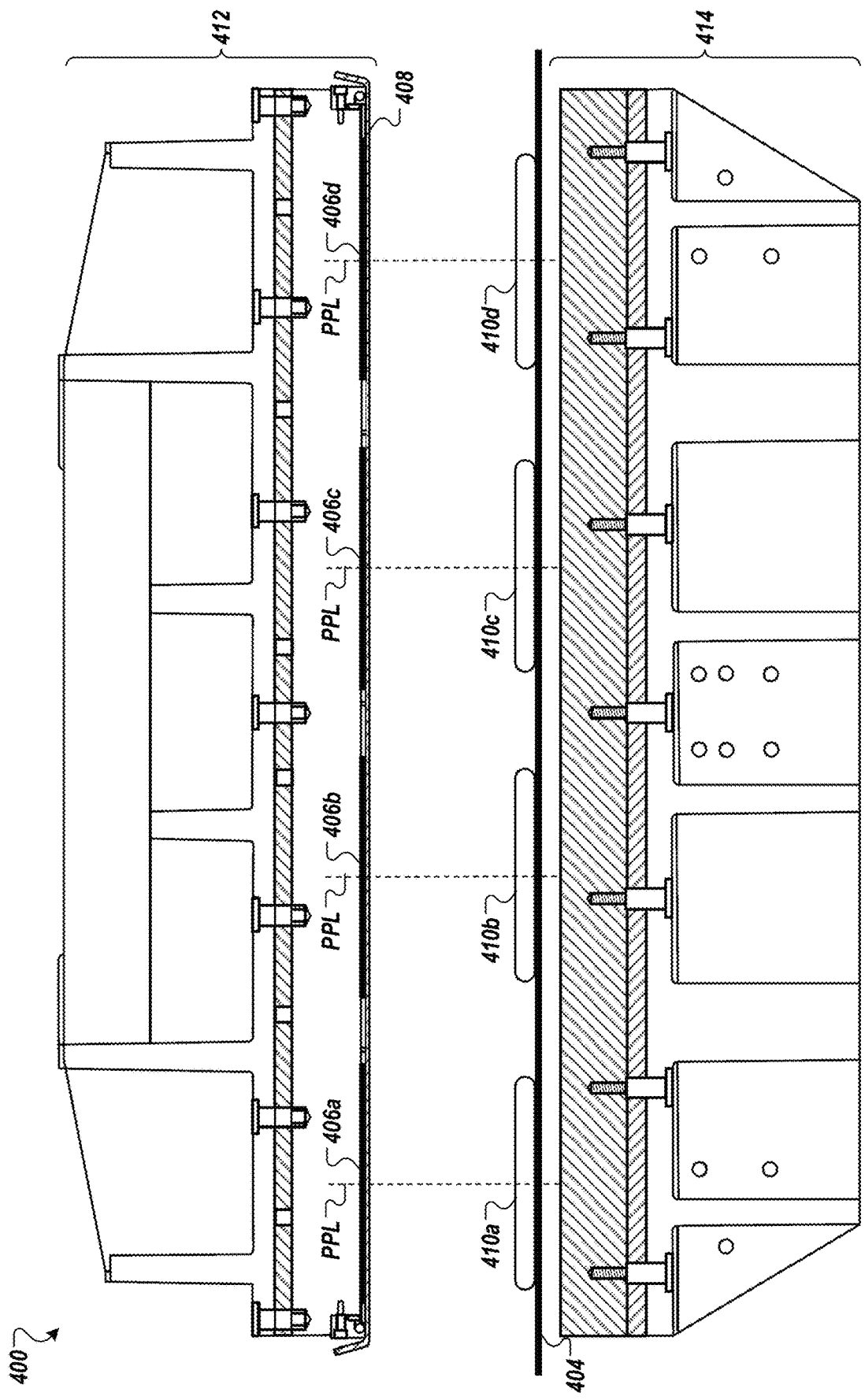

FIGS. 4A-B depict an example of a press 400 for processing comestibles 402a-d. The comestibles 402 can be pre-pressed comestibles, partially pressed comestibles, unformed comestibles, or a combination of two or more of these. The press 400 can receive the comestibles 402a-d when a surface 404, e.g., a conveyor, moves the comestibles 402a-d into the press 400.

The surface 404 can position the comestibles 402a-d so that a center of each of the comestibles, which is substantially aligned with a target position TP on the surface 404, substantially aligns with a center of a pressing pattern location PPL in the press 400, represented by the dashed lines in FIGS. 4A-B. For instance, the press 400 can include multiple pressing pattern locations PPL based on a corresponding pressing pattern layout, e.g., a 4×4 pressing pattern layout or another appropriate layout. The press 400 can include zero or more spacers 406a-d at a pressing pattern location PPL. For instance, a first pressing pattern location PPL can include one spacer 406a, a second pressing pattern location PPL can include five spacers 406b, and third and fourth pressing pattern locations PPL can include no spacers 406c-d. The quantities of spacers 406a-d can be selected so that a pressing surface of the press 400, e.g., a lower surface of the skin 408, forms pressed comestibles 410a-d, depicted in FIG. 4B, that each are likely to have a size that satisfies a threshold size range for a pressing pattern layout.

The press 400 can include an upper pressing platen 412 that applies pressure to the comestibles from above. The upper pressing platen 412 can include an upper insulator, an upper pressing plate, and an upper portion. The upper insulator and the upper pressing plate can be mounted to the upper portion with non-conductive bolts. The upper pressing platen 412 can includes a skin 408 that protects the bottom surface of the upper pressing plate from wear caused by heat, pressure, or both, during processing of the comestibles 402a-d.

The press 400 can use different pressures based on the threshold size range for the pressed comestibles 410a-d, e.g., for the pressing pattern layout. For example, a higher pressure, e.g., 48 pounds per square inch ("PSI"), can be used to create pressed dough balls with a larger diameter, e.g., 12 inches, and a lower pressure, e.g., 13 PSI, can be used to create pressed dough balls with a smaller diameter, e.g., 5 inches.

The diameter of the pressed comestibles 410a-d is inversely proportional to the thickness of the pressed comestibles 410a-d. For example, increasing the diameter of a specific pressed comestible decreases the thickness of the specific pressed comestible. In some examples, a comestible with a specific volume has a diameter of 10 inches and a thickness of ¼ inches, and a comestible with the same volume and an 8-inch diameter has a thickness of 25/64 inches.

The press 400 can include a lower pressing platen 414. The lower pressing platen 414 applies pressure to the comestibles 402a-d from below during processing. For example, the lower pressing platen 414 supports the comestibles 402a-d on the conveyor 404 while the upper pressing platen 412 presses down on the top surface of the comestibles 402a-d.

The lower pressing platen 414 includes a lower pressing plate and a lower insulator. The lower pressing plate has a similar configuration, e.g., size and composition, to that of the upper pressing plate.

In some implementations, during comestible processing, the lower pressing plate has a lower temperature than a temperature of the upper pressing plate in order to reduce the likelihood that a comestible 410a-d will stick to the skin 408 of the upper pressing plate after being pressed. For example, the pressed comestibles 410a-d are more likely to stick to a cooler surface, so the temperature of the lower pressing plate is less than the temperature of the upper pressing plate and the skin 408 so that the pressed comestibles 410a-d will more likely rest on the conveyor 404 after pressing instead of sticking to the skin 408 and lifting off of the conveyor 404.

The spacers 406a-d can be placed on the skin between the upper surface of the skin 408 and a bottom surface of the upper pressing plate. Each of the spacers 406a-d can include one or more thermally conductive shims. For example, the first spacer 406a can include two shims, a first with a thickness of 0.025 inches and a second with a thickness of 0.2 inches, and the second spacer 406b can include one shim with a thickness of 0.03 inches.

One or more of the spacers 406a-d can have a circular shape that corresponds with the shape of the pressed comestibles 410a-d. In some implementations, the shims can be square or rectangular with a size greater than a desired diameter of the pressed comestibles 410a-d.

One or more of the spacers 406a-d can have a size selected based on the threshold size range for the pressed comestibles 410a-d. For example, when the threshold size range for the pressed comestibles 410a-d is within a threshold distance of 10 inches, one or more of the spacers 406a-d can have a diameter of 12 inches.

In some implementations, the diameter of a spacer 406a-d is less than the threshold size range for the pressed comestible 410a-d. For example, when the threshold thickness of a pressed comestible 410a-d is thin (e.g., between about 1.5 to about 3 mm), the pressure and heat of the press 400 might sometimes causes cracks to form near the edges of the pressed comestible 410a-d. Although heating the pressed comestible 410a-d can help the pressed comestible 410a-d maintain its shape, heating can reduce the moisture in the pressed comestible 410a-d and cause cracks to form in the pressed comestible 410a-d. Using spacers 406a-d that are smaller than the threshold size range for the pressed comestible 410a-d can create a thicker edge around the circumference of the pressed comestible 410a-d because a reduced amount of pressure is applied to the comestible material, e.g., dough, that extends beyond the edges of the spacers 406a-d.

The thicker edge around the circumference can have a reduced likelihood of cracking because of the additional thickness of the comestible material. Less heat is transferred to the thicker edge because of reduced contact between the spacers 406a-d and the thicker edge, which causes less moisture to be removed from the thicker edge of the pressed comestible 410a-d and reduces the possibility of cracks forming in the thicker edge.

To increase a likelihood of a uniform thicker edge of a pressed comestible 410a-d, the unformed comestibles, e.g., the unformed comestibles 102a-d, should be align with the pressing pattern locations PPL, and the spacers 406a-d, as much as possible. For example, a central vertical axis of the pressing pattern location PPL, which can correspond to a central vertical axis of any spacers 406a-d at the pressing pattern location PPL, should approximately align as closely as possible with a central vertical axis of the comestible 402a-d that will be pressed by the bottom of the pressing surface of the skin 408 below the spacer 406a-d.

For example, when the comestibles 402a-d are placed on the conveyor 404 by the comestible loader, each of the comestibles 402a-d in a press cycle are spaced substantially evenly apart according to a pressing pattern layout. The conveyor 404 can receive the comestibles 402a-d from the comestible loader and move the pattern of comestibles in a forward direction along the comestible movement axis and into the press 400. When the comestibles 402a-d are in the press 400, center vertical axes the comestibles 402a-d, e.g., which substantially align with the target position TP, substantially align with a central vertical axis of a corresponding pressing pattern location PPL and any spacers 406a-d at that pressing pattern location PPL.

When the upper pressing platen 412 presses down on the comestibles 402a-d in the press cycle, the centers of portions of the pressing surface of the skin 408 that correspond to the pressing pattern locations PPL apply pressure to the centers of the comestibles 402a-d. This application of pressure on the comestibles 402a-d creates the pressed comestibles 410a-d, depicted in FIG. 4B.

Figure 5D:
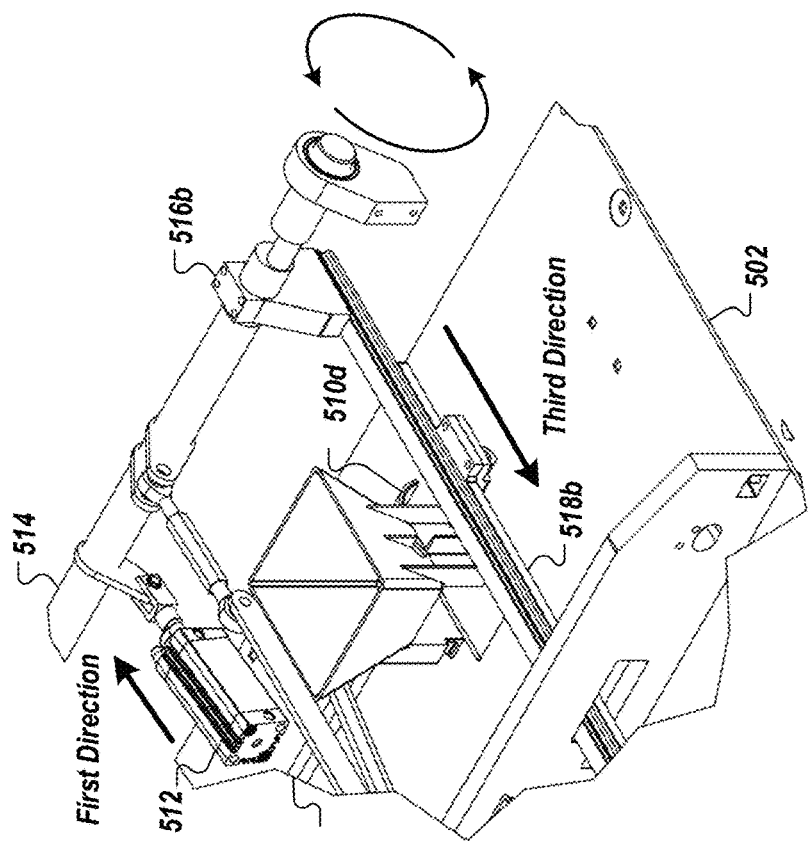

FIGS. 5A-D depict an example of a comestible loader 500 with a loader plate 502 and multiple openings 504a-d with loader plate vertical actuator 515a-b. The multiple openings 504a-d can correspond to a pressing pattern layout. For instance, FIG. 5A depicts the comestible loader 500 for a 4×4 pressing pattern layout.

The comestible loader 500 includes two or more flatteners 510a-d for each of the multiple openings 504a-d. For example, the comestible loader 500 can include a first flattener 510a-b and a second flattener 510c-d are adapted to move at least partially inside of each of the multiple openings 504a-d. In the example depicted in FIGS. 5A-B, a first flattener 510a and a second flattener 510c are adapted to move into the opening 504a and a third flattener 510b and a fourth flattener 510d are adapted to move into the opening 504d. The flatteners 510a-d are coupled to the loader plate 502.

The comestible loader 500 includes one or more actuators. The actuators can be any appropriate type of actuator, such as an electromechanical actuator, e.g., an electric motor or solenoid, a pneumatic actuator, e.g., controlled by air pressure, or a hydraulic actuator, e.g., controlled by pressure of a fluid, such as a liquid or gas.

The one or more actuators can couple to and control a first valve 506. The first valve 506 couples to one or more axles 508a-b. The one or more actuators can control the first valve 506 to rotate the one or more axles 508a-b that are coupled to the flatteners 510a-d. The first valve 506 can be a rotary valve, a servo pneumatic valve, or any other appropriate type of valve. Rotation of the one or more axles 508a-b can cause rotation of the flatteners 510a-d. For instance, the actuators can include a first axle 508a that connects with each first flattener 510a-b in a row of openings in the pressing cycle layout. The actuators can include a second axle 508b that connects with each second flattener 510c-d in the row of openings in the press cycle layout such that each of the first flatteners 510a-b is adapted to at least partially move within an opening 504a-d with a corresponding one of the second flatteners 510c-d.

The one or more actuators can couple to and control a second valve 512. The second valve 512 can be a servo pneumatic valve adapted to actuate a translation axle 514. The second valve 512 can be a pneumatic cylinder, e.g., an air cylinder, used to actuate the translation axle 514.

Actuation of the translation axle 514 can horizontally translate the one or more axles 508a-b that are coupled to the flatteners 510a-d using one or more rods 516a-b coupled to the one or more axles 508a-b and the translation axle 514. When the second valve 512 horizontally translates the one or more axles 508a-b using the translation axle 514, the horizontal translation of the one or more axles 508a-b can cause horizontal translation of the flatteners 510a-d. The horizontal translation of the flatteners 510a-d can cause the flatteners 510a-d to move from the outer position to the inner position, from the inner position to the outer position, or both, as described above with reference to FIGS. 3A-B.

In some implementations, the second valve 512 includes a controller that determines an amount of translation for the flatteners 510a-d. For instance, the second valve 512 can determine when to stop translation for the inner position, for the outer position, or both. When a process recipe includes parameters for one or both of the inner position or the outer position, the second valve 512 can receive instructions from a computer system, e.g., that stores the process recipe parameters in memory, that indicate when the second valve 512 should stop translation for one or both of the inner position or the outer position.

The comestible loader 500 can use the actuators, including the valve 506 and the axles 508a-b, to horizontally translate, rotate, or both, the flatteners 510a-b at the same time it can articulate the loader plate 500 with the vertical actuator 515a-b to make the combination of moves in unison, all the while processing comestibles. For instance, the comestible loader 500 can use the one or more actuators to rotate a pair of flatteners 510a-b during a press cycle. The comestible loader 500 can use the one or more actuators to horizontally translate a pair of flatteners 510a-b during a press cycle. The comestible loader 500 can use the one or more actuators to rotate and horizontally translate a pair of flatteners at substantially the same time during a press cycle, e.g., as described above with reference to time periods $T_{5A-C}$, $T_{6A-B}$, and $T_7$ in FIG. 3B or time period $T_7$ in FIG. 3A.

In some implementations, the comestible loader 500 can include more than two flatteners 510a-b adapted to move at least partially positioned within an opening 504a-d. For instance, the comestible loader 500 can include two pairs of flatteners 510a-b within a single opening 504d. Each pair of flatteners can be positioned on opposite sides of the single opening 504d and coupled to the loader plate 502. Use of more flatteners 510a-b can improve a likelihood that the comestible loader 500 will position a comestible at a target position TP on a surface.

In these implementations, the comestible loader 500 can include two first valves 506. A first motor can rotate and horizontally translate first flattener pairs along a comestible movement axis. A second motor can rotate and horizontally translate second flattener pairs along an orthogonal axis that is perpendicular to the comestible movement axis in a plane that is substantially parallel to a surface onto which the comestible loader 500 places the comestibles, a bottom surface of the loader plate 502, or both.

Figure 5C:
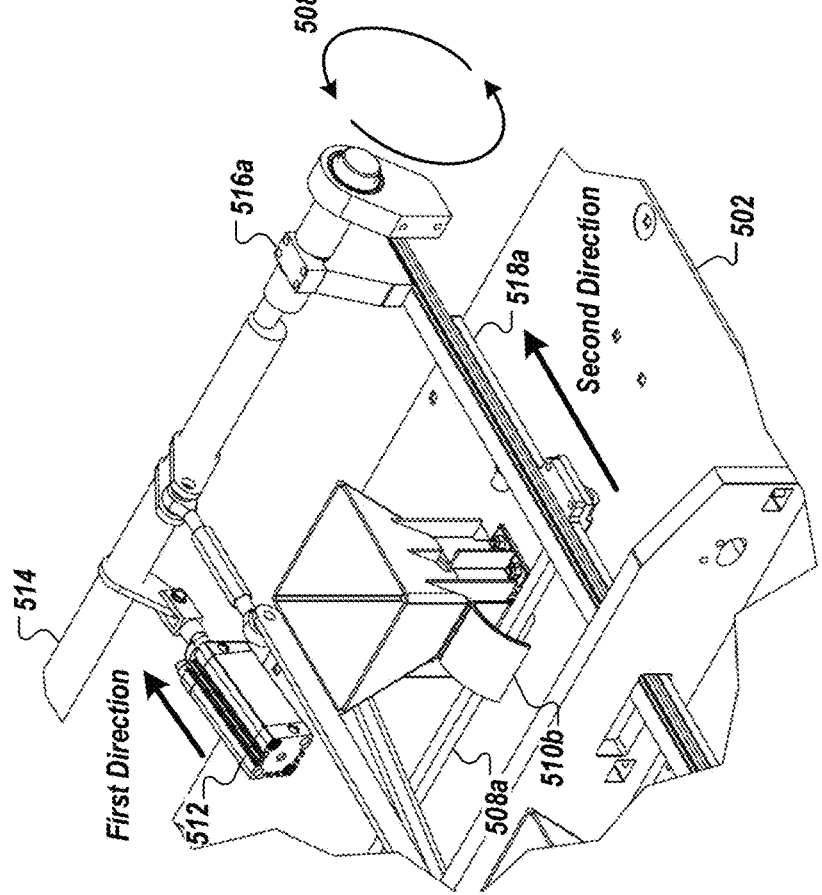

FIG. 5C-D depict the translation of the flatteners 510b, 510d by the translation axle 514 caused by the second valve 512. FIG. 5C depicts the translation of a first rod 516a coupled to a first flattener 510b and FIG. 5D depicts the translation of a second rod 516b coupled to a second flattener 510d that would occur at substantially the same time as the translation of the first rod 516a.

Each of the rods 516a-b can be a mechanical eccentric, a crankshaft, or another appropriate device that converts rotational movement of the translation axle 514 into linear movement of the rods 516a-b. For example, when the rods 516a-b are mechanical eccentrics, each of the rods 516a-b can include an eccentric sheave and strap that couple to the translation axle 514. The rods 516a-b can also include shafts 518a-b that couple to respective ones of the one or more axles 508a-b.

When the second valve 512 activates, e.g., by moving in a first direction, the second valve 512 can cause the translational axle 514 to rotate. The rotation of the translational axle 514 can cause the rods 516a-b to translate. For instance, the first rod 516a can translate in a second direction, e.g., toward a back edge of the loader plate 502. The second rod 516b can translate in a third direction, e.g., toward a front edge of the loader plate 502. The second direction can be substantially the opposite direction from the third direction.

In some examples, the first rod 516a and the second rod 516b can be coupled to the translational axle 514 out of phase to enable to first rod 516a to translate in the second direction while the second rod 516b substantially concurrently translates in the third direction. For instance, the first rod 516a and the second rod 516b can be out of phase by 90°.

When the first valve 506 couples to the axles 508a-b that are translated using the rods 516a-b, as depicted in FIG. 5A, the first valve 506 can couple indirectly to the loader plate 502. For instance, the translational axle 514 can couple to the loader plate 502. The rods 516a-b can couple to the translational axle 514. In some examples, the rods 516a-b can couple to the loader plate 502. The first valve 506 can couple to the rods 516a-b. The axles 508a-b can couple to the rods 516a-b. This can enable the first valve 506 to "float" above a surface of the loader plate 502 while indirectly coupling to the loader plate 502.

Figure 6:
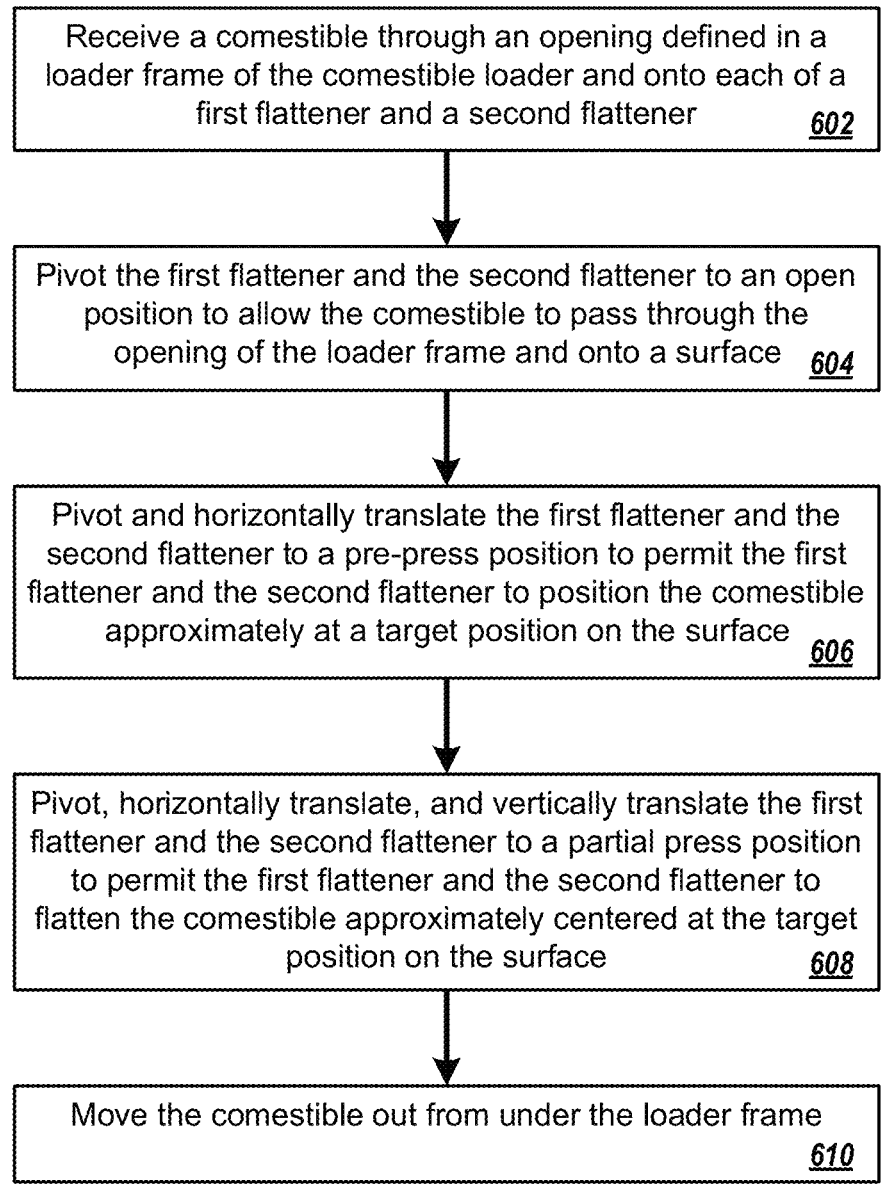
FIG. 6 is a flow diagram of a process for approximately positioning a comestible at a target position on a surface.

FIG. 6 is a flow diagram of a process 600 for approximately positioning a comestible at a target position on a surface. For example, the process 600 can be used by the comestible system 100 described with reference to FIG. 1.

A comestible system receives a comestible through an opening defined in a loader frame of a comestible loader and onto each of a first flattener and a second flattener (602). The first flattener and the second flattener can be in a closed position to receive the comestible. For instance, a comestible loader included in the comestible system can include the loader frame. The comestible loader can receive the comestible through the opening in the loader frame.

The comestible system pivots the first flattener and the second flattener to an open position to allow the comestible to pass through the opening of the loader frame and onto a surface (604). For instance, the comestible loader can include one or more first actuators. The comestible loader can use the one or more first actuators to pivot the first flattener and the second flattener to the open position.

The comestible system pivots and horizontally translates the first flattener and the second flattener to a pre-press position to permit the first flattener and the second flattener to position the comestible approximately at a target position on the surface (606). The comestible system can use the one or more first actuators to pivot and horizontally translate the first flattener and the second flattener to the pre-press position.

In some examples, the comestible system includes the one or more first actuators and one or more second actuators. The comestible system can use the one or more first actuators to pivot the first flattener and the second flattener to the pre-press position. The comestible system can use the one or more second actuators to horizontally translate the first flattener and the second flattener to the pre-press position, e.g., that includes the first flattener and the second flattener at an inner position.

A first actuator coupling position can be a position at which a first flattener couples with the one or more first actuators, e.g., with a corresponding first axle. A second actuator coupling position can be a position at which a second flattener, that is paired with the first flattener, couples with the one or more first actuators, e.g., with a corresponding second axle. The inner position can include the corresponding first flattener and the second flattener actuator coupling positions closer together than an outer position for the coupling positions at which the first flattener and the second flattener receive the comestible on their respective upper surfaces. The inner position can include the corresponding first flattener and the second flattener actuator coupling positions closer together than an outer position for the coupling positions at which the first flattener and the second flattener are located for the open position.

The comestible system pivots, horizontally translates, and vertically translates the first flattener and the second flattener to a partial press position to permit the first flattener and the second flattener to flatten the comestible approximately centered at the target position on the surface (608). For instance, the comestible system can include one or more third actuators that vertically translate the first flattener and the second flattener. The comestible system can use the actuators, e.g., the one or more first actuators, to pivot, horizontally translate, or both, the first flattener and the second flattener. The comestible system can use the one or more second actuators to horizontally translate the first flattener and the second flattener, e.g., when the one or more first actuators pivot and do not horizontally translate the first flattener and the second flattener.

The comestible system moves the comestible out from under the loader frame (610). For example, the surface, e.g., a conveyor, moves the comestible out from under the loader frame. The surface can position the comestible in a press, e.g., at a location that substantially aligns a center of the comestible with a pressing pattern location in the press. The pressing pattern location can be a vertical central axis that passes through the center of a location in the press at which a spacer can be located.

Because the comestible system pivots and horizontally translates the first flattener and the second flattener to the pre-press position, the comestible system has a higher likelihood of positioning the comestible in the press at a location that substantially aligns the center of the comestible with the pressing pattern location in the press. This likelihood can be increased, compared to other systems, when the comestible system includes multiple openings in the loader frame and processes multiple comestibles at a time. Each of the multiple comestibles processed at a time can correspond to one of the openings in the loader frame. Each of the multiple openings can be specified by a pressing pattern layout.

In some implementations, the process 600 can include additional steps, fewer steps, or some of the steps can be divided into multiple steps. For example, the comestible system can receive the comestible, pivot the first flattener and the second flattener to the open position, and pivot and horizontally translate the first flattener and the second flattener to the pre-press position without performing the other steps in the process 600. In some examples, the comestible system can receive the comestible; pivot the first flattener and the second flattener to the open position; pivot and horizontally translate the first flattener and the second flattener to the pre-press position; and pivot, horizontally translate, and vertically translate the first flattener and the second flattener to the partial press position without performing the other steps in the process 600.

A number of implementations have been described. Nevertheless, it will be understood that various modifications may be made without departing from the spirit and scope of the disclosure. For example, various forms of the flows shown above may be used, with steps re-ordered, added, or removed.

Figure 7:
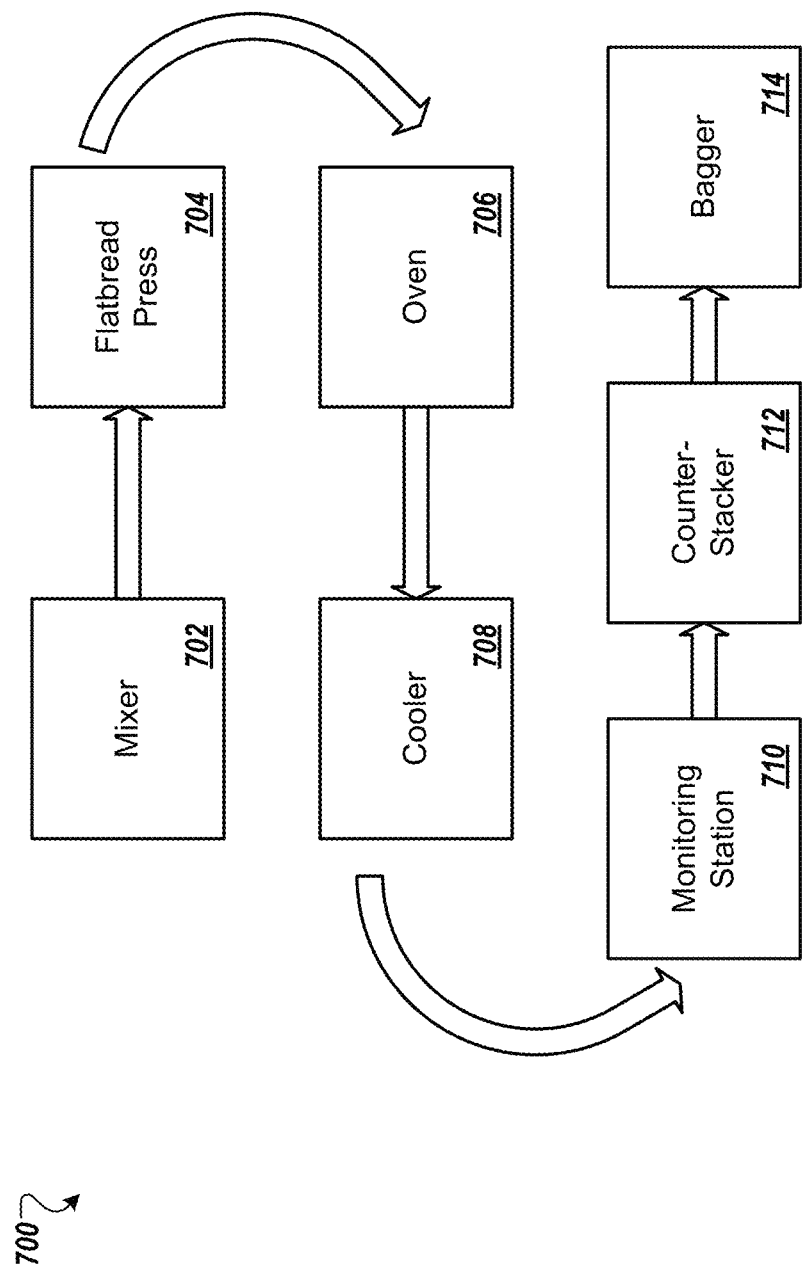
FIG. 7 depicts an example of some devices that can be included in a flatbread processing system.

FIG. 7 depicts an example of some devices that can be included in a flatbread processing system 700. The flatbread processing system 700 can be used to process the comestibles described above with reference to FIGS. 1-6. The flatbread processing system 700 does not depict all devices that could be included in a system, depending on system configuration, such as a dough ball loader that forms balls of dough from batter created by a mixer 702 and places the dough balls on the flatbread press 704 using a comestible loader, e.g., the comestible loader 108 described with reference to FIG. 1.

The flatbread processing system 700 includes a mixer 702. The mixer 702 combines multiple ingredients according to a process recipe. The mixer 702 mixes the multiple ingredients to create a dough batter.

The mixer 702 can be connected to a former (not shown) that creates dough balls from the batter created by the mixer 702. The former can place the dough balls in a dough ball loader that is configured according to a pressing pattern layout for the flatbread being made by the flatbread processing system 700. The former selects an amount of batter based on a threshold comestible size range for the dough balls, e.g., to create 10 inch tortillas or 8 inch tortillas. The threshold comestible size range can be a comestible parameter, e.g., specified by the process recipe.

The dough ball loader can place the dough balls on a conveyer included in the flatbread press 704. Once a dough ball is placed on a location on an upper surface of the conveyor for each of the locations in a pressing pattern layout, e.g., a 3×3 pressing pattern layout, the flatbread press 704 moves the conveyor forward to place the dough balls under the press. The flatbread press 704 then presses the dough balls. During the pressing operation, the flatbread press 704 can slightly bake the dough balls to increase a likelihood that the pressed dough balls will maintain their pressed shape.

The flatbread press 704 can then transfer the pressed dough balls to a discharge station included in the flatbread press 704. The discharge station can include a heater to parbake the pressed dough balls. Use of the discharge station can enable the flatbread press 704 to use a lower temperature during the pressing process.

The flatbread processing system 700 then transfers the pressed dough balls from the flatbread press 704 to an oven 706. The flatbread processing system 700 can use one or more conveyors to transfers the dough balls from the flatbread press 704 to the oven 706.

The oven 706 includes one or more oven conveyors that transfer the pressed dough balls through the oven 706 during a cooking process. As the one or more conveyors transfer the pressed dough balls through the oven 706, the pressed dough balls are cooked so that when the pressed dough balls exit the oven 706, the cooking process is likely complete. In some implementations, the pressed dough balls can proceed to another cooking process after removal from the oven 706.

After cooking, the flatbread processing system 700 can transfer the cooked, pressed dough balls onto one or more conveyors to transfer the pressed dough balls from the oven 706 to a cooler 708. In some implementations, the flatbread processing system 700 can use one or more conveyors that transfer the pressed dough balls to an upper portion of the cooler 708.

The cooler 708 can include multiple cooling conveyors that transport the pressed dough balls through the cooler 708. The cooler 708 can use any appropriate process, components, or both, to reduce the temperature of the pressed dough balls. For instance, as the pressed dough balls move through the cooler 708, air can move across the surfaces of the pressed dough balls to cool the pressed dough balls to a reduced temperature.

In some examples, the pressed dough balls can have a temperature close to 200° F. when entering the cooler 708. The cooler can include one or more fans to move air from an environment outside of the cooler 708 (e.g., at an ambient temperature between about 65 to about 80° F.) across the cooling conveyors and the pressed dough balls. As the air passes across the pressed dough balls, heat is removed from the pressed dough balls and the pressed dough balls are cooled.

The flatbread processing system 700 transfers the pressed dough balls from the cooler to a monitoring station 710. The monitoring station 710 can analyze one or more properties of the pressed dough balls, including the diameter and color. For instance, the monitoring station 710 can determine whether a pressed dough ball was burnt, conforms with size requirements for a process recipe for the pressing pattern, or both. In general, the monitoring station 710 can determine whether the pressed dough ball substantially conforms with one or more threshold comestible parameters for the process recipe.

The monitoring station 710 can include a dough ball removal device used to remove dough balls from the monitoring station 710 that do not conform to predetermined criteria for the recipe. For instance, the monitoring station can include one or more air blowers, e.g., one for each processing lane for the pressing pattern, to remove pressed dough balls that were overcooked, pressed too much, not pressed enough, or a combination of these.

The flatbread processing system 700 transfers the pressed dough balls that conform to the predetermine criteria to a counter-stacker 712. The counter-stacker 712 can create stacks of pressed dough balls based on a stack quantity identified in the recipe for the flatbread processing system 700.

The flatbread processing system 700 transfers stacks of pressed dough balls to a bagger 714 that places each stack into a bag. The bagged stack of pressed dough balls can then be removed from the bagger 714 and the flatbread processing system 700.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A system comprising: a comestible loader adapted to receive a comestible and place the comestible on a surface, the comestible loader comprising:
    a loader plate comprising an opening passing through the loader plate, the opening adapted for a comestible to move through the loader plate and onto the surface;
    a first flattener and a second flattener pivotably and translationally attached to the loader plate at the opening; and
    one or more actuators i) coupled to the first flattener and the second flattener, and ii) adapted to pivot and horizontally translate the first flattener and the second flattener to cause the first flattener and the second flattener to support the comestible within the opening and position the comestible approximately at a target position on the surface, wherein:
    the one or more actuators coupled to the first flattener and the second flattener are adapted to:
        pivot and translate the first flattener and the second flattener to respective first positions to cause the first flattener and the second flattener to support the comestible within the opening, the first flattener and the second flattener having a first distance between respective actuator coupling locations of the first flattener and the second flattener when at the respective first positions; and
        pivot and translate the first flattener and the second flattener to respective second positions to cause the first flattener and the second flattener to position the comestible approximately at the target position on the surface, the first flattener and the second flattener having a second distance between respective actuator coupling locations of the first flattener and the second flattener when at the respective second positions, the second distance being a different distance than the first distance.

2. The system of claim 1, comprising one or more second actuators coupled to the comestible loader to vertically actuate the loader plate up and down relative to the surface substantially concurrently with actuation of the first flattener and the second flattener by the one or more actuators.

3. The system of claim 1, wherein:
    the one or more actuators coupled to the first flattener and the second flattener and adapted to pivot and translate the first flattener and the second flattener comprise two actuators.

4. The system of claim 1, wherein:
    the one or more actuators coupled to the first flattener and the second flattener and adapted to pivot and translate the first flattener and the second flattener comprise a valve and one or more axles to pivot the first flattener and the second flattener.

5. The system of claim 1, wherein:
    the one or more actuators coupled to the first flattener and the second flattener are adapted to pivot and translate the first flattener and the second flattener to cause the first flattener and the second flattener to support the comestible within the opening, to allow the comestible to pass through the opening and onto the surface, and to position the comestible approximately at the target position on the surface.

6. The system of claim 1, wherein:
    the first positions comprise closed positions; and
    the second positions comprise pre-press positions.

7. The system of claim 6, wherein the one or more actuators are adapted to cause a first inner surface of the first flattener to contact at least part of a second inner surface of the second flattener when the one or more actuators pivot and translate the first flattener and the second flattener to the respective pre-press positions.

8. The system of claim 1, wherein the loader plate comprises a plurality of openings defined therein, and each opening of the plurality of openings passes through the loader plate is adapted for a respective comestible to move through the opening onto the surface, wherein the plurality of openings includes the opening,
    the comestible loader comprising, for each of the one or more of the plurality of openings, a respective first flattener and a respective second flattener each of which are pivotably and translationally attached to the loader plate at the respective opening.

9. The system of claim 1, comprising a loading tube aligned over the opening in the loader plate.

10. The system of claim 1, comprising the surface.

11. The system of claim 10, wherein the surface comprises a conveyor.

12. The system of claim 11, comprising a press that comprises a pressing pattern location and is adapted to form the comestible when the comestible substantially aligns with the pressing pattern location, wherein:
the conveyor is adapted to move the comestible when the comestible is approximately at the target position on the conveyor to a position in the press that substantially aligns with the pressing pattern location.

13. The system of claim 12, comprising a spacer in the press at the pressing pattern location.

14. The system of claim 1, wherein the first flattener is attached to the loader plate on a first side of the opening and the second flattener is attached to the loader plate on a second side of the opening opposite the first side.

15. The system of claim 1, comprising one or more second actuators coupled to the loader plate and adapted to vertically translate the first flattener and the second flattener to cause the first flattener and the second flattener to position the comestible approximately at the target position on the surface.

16. The system of claim 1, comprising a third flattener and a fourth flattener pivotably attached to the loader plate at the opening, wherein the one or more actuators are adapted to pivot the third flattener and the fourth flattener to position the comestible approximately at the target position on the surface.

17. The system of claim 16, wherein the third flattener and the fourth flattener are pivotably and translationally attached to the loader plate at the opening.

18. The system of claim 1, comprising:
a first valve coupled to the one or more actuators and at least one of the first flattener or the second flattener and adapted to pivot the at least one of the first flattener or the second flattener; and
a second valve coupled to the one or more actuators and at least one of the first flattener or the second flattener and adapted to horizontally translate the at least one of the first flattener or the second flattener, the second valve comprising a different valve than the first valve,
wherein the one or more actuators are adapted to cause the first valve to pivot at least one of the first flattener or the second flattener substantially concurrently with horizontal translation by the second valve of at least one of the first flattener or the second flattener.

19. A system comprising:
a comestible loader adapted to receive a comestible and place the comestible on a surface, the comestible loader comprising:
a loader plate comprising an opening passing through the loader plate, the opening adapted for a comestible to move through the loader plate and onto the surface;
a first flattener and a second flattener a pivotably and translationally attached to the loader plate at the opening, ii) adapted to partially press the comestible in a partially closed position after the comestible has passed through the opening when the first flattener and the second flattener are in an open position, and iii) adapted to second partially press the comestible while in a closed position after the first flattener and the second flattener partially press the comestible in the partially closed position;
one or more first actuators i) coupled to the first flattener and the second flattener, and ii) adapted to pivot and translate the first flattener and the second flattener to cause the first flattener and the second flattener to support the comestible within the opening and position the comestible approximately at a target position on the surface; and
one or more second actuators coupled to the comestible loader to vertically actuate the loader plate up and down relative to the surface substantially concurrently with actuation of the first flattener and the second flattener by the one or more first actuators.

20. The system of claim 19, wherein:
the one or more first actuators coupled to the first flattener and the second flattener and adapted to pivot and translate the first flattener and the second flattener comprise two actuators.

21. The system of claim 19, wherein:
the one or more first actuators coupled to the first flattener and the second flattener and adapted to pivot and translate the first flattener and the second flattener comprise a valve and one or more axles to pivot the first flattener and the second flattener.

22. The system of claim 19, wherein:
the one or more first actuators coupled to the first flattener and the second flattener are adapted to pivot and translate the first flattener and the second flattener to cause the first flattener and the second flattener to support the comestible within the opening, to allow the comestible to pass through the opening and onto the surface, and to position the comestible approximately at the target position on the surface.

23. The system of claim 19, wherein:
the one or more first actuators coupled to the first flattener and the second flattener are adapted to:
pivot and translate the first flattener and the second flattener to respective closed positions to cause the first flattener and the second flattener to support the comestible within the opening, the first flattener and the second flattener having a first distance between respective actuator coupling locations of the first flattener and the second flattener when at the closed positions; and
pivot and translate the first flattener and the second flattener to respective pre-press positions to cause the first flattener and the second flattener to position the comestible approximately at the target position on the surface, the first flattener and the second flattener having a second distance between respective actuator coupling locations of the first flattener and the second flattener when at the pre-press positions, the second distance being a different distance than the first distance.

24. The system of claim 19, wherein the one or more first actuators are adapted to cause a first inner surface of the first flattener to contact at least part of a second inner surface of the second flattener when the one or more first actuators pivot and translate the first flattener and the second flattener to the partially closed position.

25. The system of claim 19, wherein the loader plate comprises a plurality of openings defined therein, and each opening of the plurality of openings passes through the loader plate is adapted for a respective comestible to move through the opening onto the surface, wherein the plurality of openings includes the opening,
the comestible loader comprising, for each of the one or more of the plurality of openings, a respective first flattener and a respective second flattener each of which are pivotably and translationally attached to the loader plate at the respective opening.

26. The system of claim 19, comprising a loading tube aligned over the opening in the loader plate.

27. The system of claim 19, comprising the surface.

28. The system of claim 27, wherein the surface comprises a conveyor.

29. The system of claim 28, comprising a press that comprises a pressing pattern location and is adapted to form the comestible when the comestible substantially aligns with the pressing pattern location, wherein:
   the conveyor is adapted to move the comestible when the comestible is approximately at the target position on the conveyor to a position in the press that substantially aligns with the pressing pattern location.

30. The system of claim 19, wherein the first flattener is attached to the loader plate on a first side of the opening and the second flattener is attached to the loader plate on a second side of the opening opposite the first side.

\* \* \* \* \*